(12) United States Patent
Tanaka et al.

(10) Patent No.: US 6,315,455 B1
(45) Date of Patent: Nov. 13, 2001

(54) ROLLING BEARING

(75) Inventors: Susumu Tanaka; Manabu Ohori, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/541,595

(22) Filed: Apr. 3, 2000

(30) Foreign Application Priority Data

Apr. 1, 1999 (JP) .................................................. 11-094979
Jul. 1, 1999 (JP) .................................................. 11-187841
Feb. 17, 2000 (JP) .................................................. 12-039880

(51) Int. Cl.$^7$ ................................ F16C 33/32; C23C 8/26
(52) U.S. Cl. .......................... 384/492; 384/625; 148/318; 148/906
(58) Field of Search .................................... 384/492, 625, 384/913, 569; 148/318, 319, 906

(56) References Cited

U.S. PATENT DOCUMENTS

| | | | |
|---|---|---|---|
| 5,700,546 | * 12/1997 | Fujii et al. | 384/492 X |
| 5,873,956 | 2/1999 | Tanaka et al. | 148/318 |
| 5,998,042 | * 12/1999 | Tanaka et al. | 384/492 X |
| 6,086,686 | * 7/2000 | Tanaka et al. | 384/492 X |
| 6,171,411 | * 1/2001 | Okita et al. | 148/319 |

FOREIGN PATENT DOCUMENTS

| | | |
|---|---|---|
| 2315 079 A | 1/1998 | (GB) . |
| 2315 525 A | 2/1998 | (GB) . |
| 61-119674 | 6/1986 | (JP) . |
| 5-179401 | 7/1993 | (JP) . |
| 10-131970 | 5/1998 | (JP) . |
| 11-80923 | 3/1999 | (JP) . |

OTHER PUBLICATIONS

Combined Search and Examination Report.

* cited by examiner

Primary Examiner—Thomas R. Hannon
(74) Attorney, Agent, or Firm—Sughrue, Mion, Zinn, Macpeak & Seas, PLLC

(57) ABSTRACT

The rolling bearing according to the invention comprises a dense nitride layer formed on the surface layer of the rolling elements and optionally an optimum carbonitride layer formed on the races. In this arrangement, the deterioration of durability due to vibration or impact load during transportation can be prevented, not to mention improvement of stillness. Further, the deterioration of impact resistance required for hybrid bearing can be prevented. The release of pilot pressure and defective of acoustic properties due to electrostatic attraction of dust can be prevented. At the same time, the rolling element of the invention comprises a compound layer having an extremely high hardness formed uniformly, making it possible to finish to a high precision. Moreover, a great effect can be exerted of preventing the change of properties with time at high temperature or the deterioration of acoustic properties under other severe working conditions. A novel rolling bearing is provided comprising an outer race, an inner race and a plurality of rolling elements or comprising an outer race, a shaft and a plurality of rolling elements, characterized in that the rolling elements have a dense nitride layer on the finished surface thereof and the nitride layer comprises a compound layer having a hardness Hv of 900 or more and a diffusion-hardened layer.

11 Claims, 13 Drawing Sheets

200μm

25μm

50μm

50μm

200μm

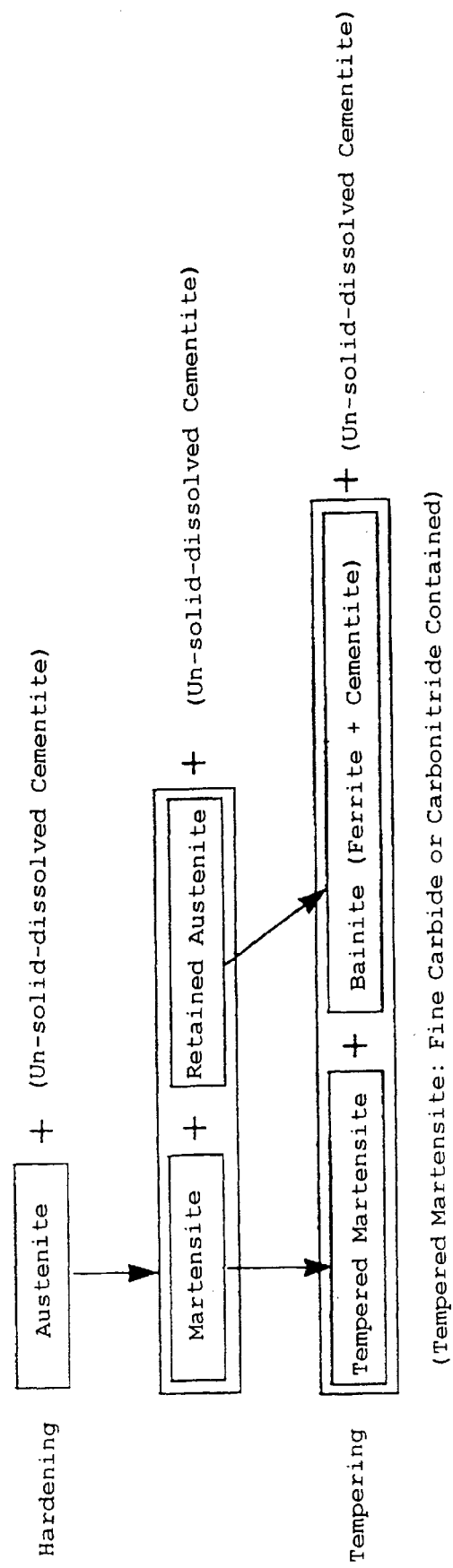

ROLLING BEARING

FIELD OF THE INVENTION

The present invention relates to the enhancement of the performance of an extremely small diameter data device rolling bearing for supporting swing arm for HDD or the like or high speed rotating spindle or a rolling bearing for fan motor required to be still, which is incorporated in hard disc drive device (HDD), video tape recorder (VTR), digital audio tape recorder (DAT) or turbo charger, fan motor or cleaner motor for vehicle.

BACKGROUND OF THE INVENTION

In general, a rolling bearing is repeatedly subject to contact stress due to rolling of the rolling elements on the races. Thus, the material of the rolling bearing is required to exhibit a sufficient hardness, withstand load and show a prolonged rolling fatigue life and a good abrasion resistance against slippage. To this end, there are used SUJ2 according to JIS as bearing steel, SUS440C according to JIS or 13Cr martensite stainless steel as stainless steel and steel material obtained by hardening or carburizing or carbonitriding steel corresponding to JIS SCR420 as case hardening steel. Having been subjected to hardening and tempering, these steel materials have a hardness HRC of from 58 to 64 to attain a sufficient rolling fatigue life.

Among rolling bearings, ball bearings for use in data device such as HDD and VTR or fan motor or the like must meet extremely severe requirements for torque, acoustic properties and noise reduction and thus are finished to an extremely high precision.

As the material of these ball bearings there is often used SUJ2, which is a high carbon-chromium bearing steel, SUS440C, which is a martensite stainless steel, 0.7C–13Cr stainless steel or the like. In order to obtain required hardness or abrasion resistance, these bearing steel materials are subjected to hardening and tempering. The resulting bearing race has a hardness HRC of from 58 to 64. It is usual that the rolling element is essentially formed by the same material as that of the races or one of the inner race and the outer race except for special cases.

In recent years, however, as devices have been smaller in size and more portable, various problems have arisen. In other words, the recent studies have shown that as devices have been smaller in size, it has been more likely that the devices can be subject to drop or vibration during transportation, causing the ball bearing incorporated therein to be damaged, though slightly, and hence causing the deterioration of the performance of the devices. Explaining further, when impact load is applied to a device, a small-sized ball bearing in particular is subject to permanent deformation of the raceway surface even under a relatively small impact load, causing deterioration of acoustic properties or uneven rotary torque resulting in the deterioration of the device comprising such a ball bearing incorporated therein, partly because the ellipsoidal area developed by the contact of the raceway surface of races with the rolling surface of rolling element is small. It is thought that this problem is attributed to the fact that the retained austenite incorporated in the steel has a low yield stress as described in JP-A-7-103241 (The term "JP-A" as used herein means an "unexamined published Japanese patent application"). In order to reduce the content of retained austenite while maintaining hardness required for ball bearing, a countermeasure has been practiced which comprises subjecting SUJ2, for example, which has been hardened, to sub-zero treatment or tempering at a temperature of as relatively high as from 220° C. to 240° C. so that the content of retained austenite can be minimized or completely eliminated to prevent the deterioration of acoustic properties due to impact load.

In recent years, on the other hand, as the demand for device portability has been growing, it has been more likely that devices can be subject to vibration. As a result, minute vibration or rocking causes fretting on the contact area of the rolling element with the inner or outer race in the rolling bearing, raising a problem of deterioration of acoustic properties. The foregoing countermeasure is aimed primarily at preventing the deterioration of acoustic properties due to impact load but doesn't take into account fretting caused by the vibration or operation of the device. Further, inpractice, rolling bearings for data device such as HDD and VTR or relatively small-sized rolling bearings which are required to be still have been given countermeasure merely for lubrication but not for material.

With respect to the problem of fretting, it has been studied whether or not a ball made of ceramics such as silicon nitride can be applied (bearing comprising a ceramics ball will be hereinafter referred to as "hybrid bearing"). It has been found that since a ceramics ball exhibits good sliding properties as well as a very high hardness and thus is little liable to damage, the use of a ceramics ball as a rolling element makes it possible to inhibit cohesive abrasion and hence provide a far greater fretting durability than steel ball. Further, the past studies show that a ceramics ball gives an extremely excellent acoustic durability after continuous operation at a high rotary speed. However, a ceramics ball is disadvantageous in that its production takes a very high cost as compared with a steel ball. Further, since a ceramics ball exhibits a remarkably great elastic modulus than a steel ball, it is liable to formation of impression on the races and deterioration of acoustic properties under impact load and thus is inferior to a steel ball in impact resistance. A ceramics ball is further disadvantageous in that it exhibits a remarkably small linear expansion coefficient as compared with a steel ball and thus is liable to release of pilot pressure due to the temperature rise accompanying the actuation of the device, resulting in the reduction of rigidity. Moreover, since a ceramics is generally insulating, it can electrostatically attract foreign matters, occasionally causing dust noise that raises percent defective. Further, since a ceramics has an extremely small specific gravity and the resulting ceramics ball is light itself, the resulting electrostatic action can cause troubles in conveyance at the assembly step.

SUMMARY OF THE INVENTION

The present invention has been worked out to give solution to the foregoing problems. It is therefore an object of the invention to provide a rolling bearing provided with an impression resistance or fretting durability against vibration or impact load and excellent in durability against continuous operation at a high rotary speed and other various properties at a reduced cost.

The foregoing object of the present invention will become apparent from the following detailed description and examples.

The inventors first made extensive studies of the reason for deterioration of acoustic properties due to rocking and found that it is mainly attributed to damage on rolling element. In other words, conventional rolling elements made of ordinary bearing steel such as SUJ2 undergo remarkable fretting abrasion on the contact area of the inner race with the outer race due to vibration or rocking (as shown by the shade in FIG. 7a) and thus show a remarkable deterioration of precision that causes deterioration of acoustic properties. On the contrary, ceramics balls undergo extremely little damage. However, as previously mentioned, ceramic balls require a remarkably high cost as compared with steel balls and have many disadvantages, e.g., poor impact resistance, release of pilot pressure, dust noise due to electrostatic action and defective assembly.

The inventors then found in connection with rolling bearings such as ball bearing requiring extreme stillness as in HDD or VTR that the deterioration of acoustic properties due to fretting damage is mainly attributed to damage on rolling element. The inventors then made extensive studies of technique which involves forming a proper modification layer on the surface of rolling bearing, particularly on the surface of steel rolling element, while essentially utilizing the characteristics of steel itself, to solve the problems of hybrid bearing, thereby drastically enhancing the properties of the bearing.

The surface modification process involves vacuum metallizing or plating. The modification coating film thus obtained is excellent in sliding properties. However, it is very difficult to form a uniform modification layer on the surface of components having a complicated shape. Further, when such a modification layer is formed on rolling members which are subject to high shear stress, the resulting coating film exhibits an insufficient surface strength with the matrix and thus can be easily peeled off or fall from the matrix, giving an insufficient reliability.

In diffusion surface modification processes such as salt bath nitriding, gas nitriding and ionnitriding which have long been used to treat the surface of mechanical components which are required to have good sliding properties, nitrogen is allowed to diffuse into a product which has been worked to a desired shape from the surface thereof while being held at a temperature of about 500° C. to 600° C. to cause hardening. Unlike deposited modification layers, a nitride layer thus formed on the product is a diffusion layer and thus is considered to have a higher interfacial strength. However, since rolling components which are subject to high shear stress receive a high shear stress at a position deeper than the nitride layer, such a nitride layer can hardly be applied to these rolling components.

This type of surface modification process has heretofore been practiced essentially for the purpose of providing sliding properties. Thus, there is little case where this type of surface modification process is applied to rolling components such as high shear stress rolling bearing. JP-A-6-341442, which is one of examples of application of thus type of surface modification process, proposes that a rolling bearing excellent in corrosion resistance which can be preferably used for roller clutch for washing machine is obtained by subjecting at least one of constituent components to salt bath nitriding to form a compound layer having a hardness Hv of from 654 to 830 and a thickness of from 5 to 20 $\mu$m on the surface thereof. Further, JP-A-10-131970 proposes that a rolling bearing which can be preferably used for auxiliary machines such as water pump for automobile engine is obtained by subjecting at least one of constituent components made of ordinary bearing steel to nitriding to provide improvement of corrosion resistance and controlling the average diameter of nitride particles in the surface layer to 1 $\mu$m or less to improve seizing resistance as in the above cited JP-A-6-341442.

However, the foregoing approaches are mainly aimed at improving corrosion resistance or seizing resistance. The foregoing approaches take into little account the core hardness against shear stress, which is essential to rolling bearing. Further, the above cited patent applications don't refer to acoustic properties, fretting, deterioration of acoustic properties due to impact load, release of pilot pressure, and solution to these problems, which are important to rolling bearings such as ball bearing for data devices such as HDD. Thus, the rolling bearings thus proposed are insufficient as ball bearing of data devices. In particular, JP-A-10-131970 has no reference to the depth of nitride layer. It is also presumed that the rolling bearing of JP-A-10-131970 is merely subjected to surface nitriding, i.e., free from so-called cutting. Thus, the rolling bearing of this patent cannot be used as ball bearing for data devices requiring stillness. As the matrix of the constituent components there is exemplified only an ordinary bearing steel such as SUJ2 and carburizing steel. Accordingly, no studies have been made of material in a true sense.

On the other hand, JP-A-5-179401 proposes that the rolling fatigue life against contamination by foreign matters can be improved by subjecting a predetermined steel having a Cr content of 3% or more to nitriding to form a nitride layer having Hv of about 1,000 so that the material can be rendered little liable to damage by foreign matters. However, this approach doesn't take into account the problems characteristic to ball bearing for data devices similarly to the foregoing approaches. There is no reference to the depth of nitride layer, etc.

Although detailed studies are needed for the process for the production of rolling bearing when a nitriding technique is applied to rolling bearings such as ball bearing for data devices such as HDD, the foregoing proposals don't take this point into sufficient account and have no reference to the quality of finished product, which is one of important factors.

The inventors then made extensive studies of the possibility of application of nitriding technique to rolling element for ball bearing which may result in the enhancement of acoustic durability and fretting durability as in hybrid bearing and give solution to the problems with hybrid bearing, i.e., poor impact resistance, release of pilot pressure and electrostatic attraction of foreign matters. As a result, it was found that when a nitride layer containing a dense compound layer having Hv 900 or more, preferably Hv 1,100 or more, is formed on the surface of a specific bearing steel as matrix and the hardness of the substrate of the nitride layer and the thickness of the compound layer are optimized, a rolling bearing such as ball bearing for data devices having extremely excellent stillness, fretting durability and impact resistance can be provided. On the other hand, however, unlike the case where a steel ball is produced from a so-called steel subjected to through hardening such as SUJ2, the foregoing process provides a surface-treated steel ball. Thus, it was also found that the foregoing process brings forth problems characteristic to nitrided steel ball at the production process.

The inventors then made extensive studies of the foregoing production process and discovered that in order to produce a nitrided steel ball to a high precision it is necessary that a raw ball be hardened, tempered, worked to a semi-finished ball having a sphericity of 3.0 $\mu$m or less, and then subjected to nitriding and finishing. Further studies were made of the possibility of further enhancement of impact resistance as compared with ordinary SUJ2 bearings with the fretting durability and acoustic durability being maintained to the level of hybrid bearing. As a result, it was found that when a rolling bearing is formed by the foregoing rolling elements and its mating members having an appropriate carbonitride layer formed on the surface thereof in combination, extremely good solutions can be given to the foregoing problems.

The rolling bearing according to the invention comprises an outer race, an inner race and a plurality of rolling elements or comprising an outer race, a shaft with raceway and a plurality of rolling elements, characterized in that the rolling elements have a dense nitride layer on the finished surface thereof and the nitride layer comprises a compound layer having a hardness Hv of 900 or more and a diffusion-hardened layer.

The sphericity and mutual diameter difference of the foregoing rolling elements are each preferably 0.05 μm or less. The surface roughness (Ra) of the rolling element is preferably 0.003 μm or less.

The foregoing rolling element is preferably coated so uniformly that the difference between the maximum thickness and the minimum thickness of the nitride layer is 5 μm or less in terms of a single rolling element.

Further, it is preferred that the compound layer in the nitride layer be 3 μm or more and the average thickness of the compound layer be 2% or less of the diameter Da of the rolling element.

It is further preferred that the foregoing rolling element be formed by a bearing steel comprising Cr in an amount of 3% or more, satisfying the relationship C %≦−0.05Cr %+1.41%, and the sum of the content of carbon and nitrogen is 0.45% or more, and comprise carbides having a size of 5 μm or less.

It is further preferred that the foregoing rolling element be formed by hardening and tempering a bearing steel, working the steel thus treated into a semi-finished sphere having a sphericity of 3.0 μm or less, and then subjecting the sphere to nitriding at a temperature of 480° C. or lower and finishing.

It is further preferred that the hardness HRC and the retained austenite content of at least one of the races and shaft, more preferably all of them be 58 or more and 6 vol % or less, respectively.

In the case where the foregoing rolling element is in the form of a ball, it is preferred hereinafter that the rolling element be formed by a steel having a Cr content of from 5% to 16% as a matrix and have a dense nitride layer having Hv 900 or more formed on the surface layer thereof.

It is further preferred that the foregoing rolling element have a core hardness HRC of 57 or more and comprise carbides having a size of 5 μm or less in terms of major axis.

The nitride layer formed on the surface of the rolling element comprises a compound layer and a diffusion layer, and it is further preferred that the thickness of the compound layer be from 0.075*2% Da to 2% Da.

It is preferred that the foregoing rolling element be subjected to lapping to have a surface roughness (Ra) of 0.003 μm or less.

It is further preferred in the rolling bearing comprising an outer race, an inner race and a plurality of rolling elements or comprising an outer race, a shaft and a plurality of rolling elements that the outer race and the inner race or the outer race and the shaft or one of these components be formed by a bearing steel and comprise a carbonitriding layer formed on the surface layer thereof and the rolling element be formed by a steel having a Cr content of from 5% or more, preferably 8% or more, and comprise a nitride layer having Hv of 1,100 or more on the surface layer thereof.

BRIEF DESCRIPTION OF THE DRAWINGS

By way of example and to make the description more clear, reference is made to the accompanying drawings in which:

FIG. 6 is a diagram illustrating the steel ball used in the examples of the invention wherein

FIG. 7 is a diagram illustrating a steel ball which has been subjected to durability test wherein

FIG. 14 is a simplified diagram illustrating the structural change due to hardening and tempering, wherein the reference numeral 1 indicates an inner race, the reference numeral 2 indicates an outer race, the reference numeral 3 indicates a rolling element, and the reference numeral 4 indicates a cage.

DETAILED DESCRIPTION OF THE INVENTION

Figure 1:
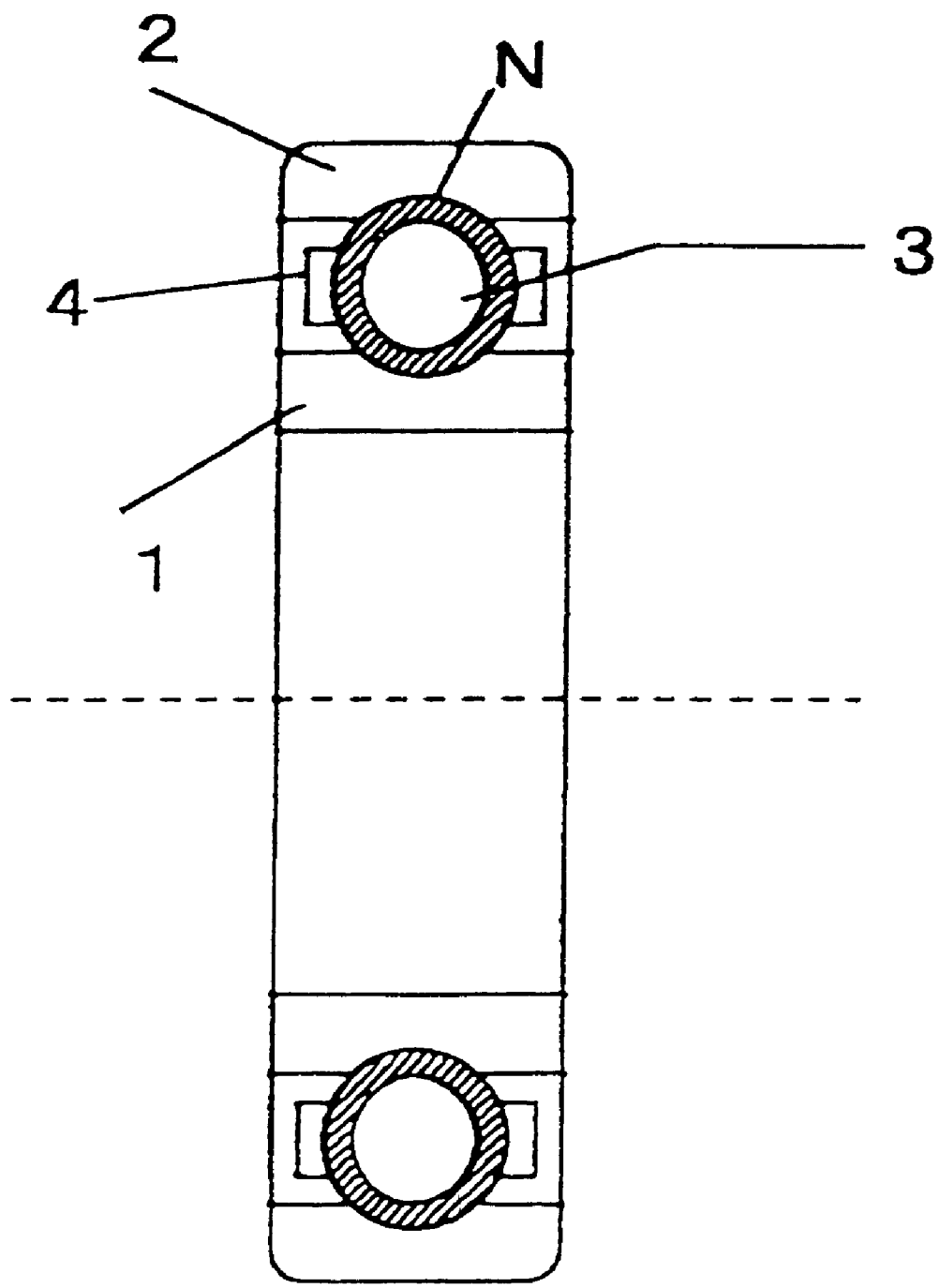
FIG. 1 is a vertical sectional view illustrating an embodiment of the rolling bearing according to the invention.

The critical significance of the present invention will be described hereinafter.

Rolling Element: Material

From the standpoint of surface properties, particularly fretting durability, the bearing steel to be used as matrix of the rolling element comprises Cr in an amount of 3% or more, preferably 5% or more, more preferably 8% or more, to stabilize the compound layer in the nitride layer on the surface of the finished sphere to Hv 900 or more. Further, from the standpoint of stillness, the bearing steel satisfies the relationship between the content of carbon and Cr: C %≦−0.05Cr %+1.41%. As a result, the alloying of Cr and the deposition of Cr nitride, etc. cause the compound layer formed on the outermost layer in the nitride layer to have an extremely high hardness and hence extremely enhanced sliding properties and fretting durability. When the foregoing relationship is not satisfied, coarse eutectic carbide particles having a major diameter of greater than 10 μm can be produced at the solidification step, causing break during line drawing on the material or deteriorating the precision in finishing. Thus, the desired precision cannot be obtained. The size of carbide particles is preferably 5 μm or less. In order to inhibit the softening of the core due to the tempering effect during nitriding, the sum of the content of carbon and nitrogen is preferably 0.45% or more. More preferably, nitrided steel having carbon substituted by nitrogen partly, at least 0.05%, is used to further inhibit the softening of the core and contribute to fine division of carbide. When nitride-forming elements such as Mo, V, W, Nb and Al are added in combination besides the foregoing components, there is shown a tendency for higher durability. Thus, these nitride-forming elements may be added so far as the cost is allowable. When the sum of the content of carbon and nitrogen is 0.45% or more and the content of nitrogen is 0.05%, the lower limit of carbon content is 0.40%. By substituting this value in the foregoing requirement formula, 20.2% can be obtained for Cr %. This value is the upper limit of Cr content.

Rolling Element: Production Process and Quality of Finished Product

The rolling element is formed by subjecting a cold-drawn wire rod to cold working or cutting by a header and flashing to prepare a raw sphere which is then hardened, tempered and optionally sub-zero treated to harden. Thereafter, the material is subjected to cutting (crude cutting) to the desired dimension, i.e., dimension to be finished plus marginal dimension (hereinafter referred to as "semi-finished sphere") The marginal dimension specifically represents the margin (allowance) required to finish the material to the desired precision in detail. Of course, it contains the expansion or shrinkage developed by nitriding.

The raw sphere which has been hardened before nitriding has an extremely small sphericity and a great mutual diameter difference and thus generally requires a marginal dimension of from scores of micrometer to hundreds of micrometer. On the other hand, the thickness of the nitride layer formed on the sphere is scores of micrometer at largest. Thus, it is substantially impossible to cause the nitride layer to remain on the finished sphere. Even if any nitride layer can be left on the finished sphere, the resulting precision is not so high as be applied to rolling bearings such as ball bearing for data device such as HDD. In other words, when the raw sphere which has been hardened is subjected to nitriding as it is, it is usual that a nitride layer is formed after the shape of the material to be nitrided. When the sphere thus nitrided is finished, the resulting nitride layer has a ununiform thickness and the internal stress developed by nitriding is ill-balanced, requiring long time of cutting to obtain a desired precision or making it impossible to attain the desired precision. This problem is remarkable particularly with raw sphere which has merely been hardened. However, even the semi-finished sphere cannot attain required quality when its precision is insufficient. Accordingly, for the reason mentioned above, the semi-finished sphere needs to have a sphericity of 3.0 μm or less, preferably 1.0 μm or less.

When the semi-finished sphere is not tempered after hardening, there is a tendency that the internal retained stress accumulated during hardening has an adverse effect on the quality of the finished product. Thus, the semi-finished which has been hardened is preferably subjected to tempering at a temperature of from 140° C. to 160° C., preferably temperature higher than the nitriding temperature, specifically at a temperature of from 450° C. to 550° C., at which secondary precipitation hardening by Cr carbide or Cr nitride takes place. In order to prevent the occurrence of surface flaw during handling, the semi-finished sphere which has been subjected to heat treatment may be subjected to mechanical hardening such as barrel finishing, shot peening and ball peening to have an enhanced hardness.

General examples of nitriding include gas nitriding, salt bath nitriding, and ionnitriding. However, ionnitriding lacks mass producibility and is strongly affected by the shape of the object to be treated, making it possible to form a uniform nitride layer on the surface of the sphere. Ordinary gas nitriding and salt bath nitriding are effected at a treatment temperature of as relatively high as from 480° C. to 600° C., at which the core of the sphere is tempered to soften. In general, nitriding is accompanied by the formation of a compound layer (white layer) on the surface of the sphere. A diffusion-hardened layer ($\alpha$-Fe) is formed under the compound layer. Accordingly, the nitride layer thus formed exhibits a higher adhesion to the matrix than the modification film obtained by vacuum deposition or plating and thus can be relatively hardly peeled off from the matrix.

On the other hand, the compound layer is relatively brittle as previously mentioned and thus is often removed before used in gears requiring prolonged pitching life (break of top of tooth) or other gears. However, the inventors have found that the compound layer is excellent particularly in sliding properties. It was further discovered that the compound layer can be extremely preferably used for spherical element such as rolling element for rolling bearing, particularly for steel ball having a diameter of 4 mm or less.

However, in the case where when the bearing is operated under a high load, the rolling element is subject to great shear stress at the position deeper than the nitride layer, and the region thus stressed has no sufficient strength, e.g., the matrix which has no sufficient heat resistance is subjected to nitriding at a high temperature to an extent such that the core thereof soften remarkably, the substrate supporting the surface nitride layer has an insufficient strength and thus can undergo plastic deformation when the rolling bearing is subject to high contact stress, causing destruction of the surface hardened layer (compound layer). Accordingly, the core hardness is preferably maintained at 57 or more (HRC).

Further, when the nitriding temperature is high, the spherical element thus nitrided has a drastically reduced sphericity and a drastically raised mutual diameter difference, causing troubles in the precision and various functions of the steel ball as previously mentioned. Accordingly, the nitriding temperature is preferably 480° C. or lower, more preferably 420° C. or lower. The lower the nitriding temperature is, the more dense is the resulting nitride layer, and the less likely can be formed a poor porous layer. The nitride layer thus formed has a high hardness and tends to have less surface roughness and waviness after lapping. Such a poor porous layer may retain a lubricating oil under relatively good lubricating conditions, providing good results in fretting durability, etc. In the case where a high precision is required in particular, however, such a poor porous layer can inhibit the accomplishment of the desired precision. Accordingly, such a poor porous layer, if any, is preferably removed as much as possible before lapping.

In the case of ordinary gas nitriding, however, when the treatment temperature lowers, the reactivity of ammonia gas lowers. In addition, a dense Cr oxide layer is formed on the surface layer of a steel having a large content of Cr, occasionally inhibiting nitriding and hence making it impossible to form a uniform nitride layer. Referring to salt bath nitriding, the melting point of the salt bath is essentially high, placing a limit upon the treatment temperature. Therefore, as the nitriding process of the invention there is preferably used Nv nitriding process (trade name: Daido Hoxan Inc.). This process comprises a step of fluorinating with a fluorine-based gas such as $NF_3$ (nitrogen trifluoride) at a temperature of from about 250° C. to 400° C. as pretreatment, and a step of nitriding with $NH_3$ gas. The foregoing fluorination treatment causes the removal of Cr oxide layer, which inhibits nitriding with $NH_3$ gas, and the formation of an extremely thin fluoride layer on the surface layer that activates the surface enormously. Thus, when nitriding is effected subsequently, a highly uniform nitride layer can be formed even at a temperature of as low as 420° C., e.g., about 400° C. The resulting nitride layer formed on the surface of the material is very dense. The nitride layer is also advantageous in that the deterioration of the precision of the rolling element after nitriding can be inhibited, making the subsequent finishing relatively easy. The foregoing process is merely exemplary. Even in salt bath nitriding, the melting point of the salt bath can be set to a range of from 420° C. to 430° C. depending on the composition of the salt bath. Thus, a low temperature salt bath nitriding at a temperature of from 450° C. to 480° C. can be employed. Further, nitriding with $NH_3$ gas in admixture with from about 50% to 80% of a carburizing gas such as Rx gas (subnitriding) is preferred to nitriding with $NH_3$ gas alone as a reaction gas because a nitride layer having a relatively high toughness can be obtained.

As a result, a nitride layer having a Hv of 900 or more, preferably 1,100 or more, is formed on the surface layer. The nitride layer thus formed comprises a compound layer made of fine precipitates such as $(Fe, Cr)_{2-4}N$, $CrN$, $Cr_2N$ and $(Fe, Cr)_{2-3}C$ to have a drastically enhanced durability. The hardness Hv of the nitride layer thus formed is more preferably from about 1,100 to 1,400, even more preferably from about 1,200 to 1,400.

When the thickness of the compound layer in the nitride layer exceeds 2% of the diameter of the rolling element, the member with which the rolling element engages is liable to impression, showing a tendency for lower impact resistance. Further, since the main phase in the vicinity of the interface of the compound layer with the diffusion layer (precipitation layer) is made of α-Fe rather than the foregoing nitride, the resulting compound layer is inferior to that of the invention in sliding properties, showing a tendency for slight deterioration of acoustic properties and fretting durability. Accordingly, taking into account the reliability, too, the thickness of the compound layer is defined to be from 3 $\mu$m to 2% of Da (2% of the diameter of the rolling element), both inclusive.

However, when the member with which the rolling element engages is rendered little liable to impression, i.e., is rendered extremely impact-resistant, the upper limit of the nitride layer doesn't need to be particularly defined. Of course, the provision of a nitride layer to a thickness greater than required leads to the prolongation of the time required for nitriding, adding to the treatment cost and causing the reduction of sphericity after nitriding that adds to the working cost. Further, the surface structure becomes rough, occasionally deteriorating various properties to disadvantage. When the member with which the rolling element engages is rendered extremely impact-resistant, the rolling element can undergo permanent deformation before the opposing member undergoes impression under a higher impact load. Supposing this case, the thicker the nitride layer is, the greater is the rigidity of the rolling element, and the more likely is that the permanent deformation of the rolling element can be prevented. Thus, the impact resistance of the rolling element is enhanced. Accordingly, even in this case, the allowable upper limit of the thickness of the nitride layer is preferably from 1.0% to 6.0%, both inclusive, more preferably from 1.0% to 4.0%, both inclusive, of the diameter Da of the rolling element.

Subsequently, the spherical element is subjected to nitriding, and then subjected to cutting so that it is finished to a desired precision, i.e., high precision sphere of grade 3 or higher according to JIS B 1501. In recent years, ball bearings to be used in data devices such as HDD have been required to have an even higher precision in sphericity. Thus, the rolling element of the invention preferably has a sphericity of 0.05 $\mu$m or less and mutual diameter difference of 0.05 $\mu$m or less and a surface roughness (Ra) of 0.003 $\mu$m or less.

The finished rolling element thus prepared has a nitride layer formed on the surface thereof to an extremely uniform thickness and thus shows enhancement in acoustic properties during high speed rotation and bar-in properties (deterioration of acoustic properties due to the change of waviness of the surface of the rolling element with time), not to mention stillness, fretting durability and impact resistance. When the difference between the maximum and minimum thickness of the nitride layer on a single sphere, i.e., the coatability of nitride layer exceeds 5 $\mu$m, there is shown a tendency for deterioration of these properties. Accordingly, the coatability of nitride layer is preferably 3 $\mu$m or less.

Bearing Race: Material and Quality of Finished Product

The bearing steel constituting the races is not limited to any bearing steel so far as it satisfies HRC58 or more, not to mention SUJ2 according to JIS G 4805. However, when the carbide particles incorporated in the bearing steel have a great size, or the bearing steel has a great content of retained austenite, good stillness or durability, e.g., impact resistance cannot be obtained. Accordingly, it is preferred that the carbide particles contained in the bearing steel be 5 $\mu$m or less in terms of major diameter and the content of retained austenite in the bearing steel be 6 vol % or less.

Preferably, the races have a carbonitrided layer on at least the rolling surface thereof. The reason for this arrangement and the critical significance of mode will be described hereinafter.

When a rolling bearing is subjected to carbonitriding, it is usually aimed at incorporating retained austenite in the surface of the rolling bearing in a large amount to provide the rolling bearing with a prolonged life under lubrication contaminated by foreign matters. As previously mentioned, however, retained austenite is harmful to a small-sized rolling bearing which is required to be still. Thus, it is not desirable that austenite be retained in the rolling bearing. Accordingly, the steel material which has been carbonitrided and hardened is then tempered at a temperature of from about 250° C. to 320° C. to have a retained austenite content of 1.0 vol-% or less. Further, a good impact resistance cannot be obtained even after carbonitriding unless the carbonitrided layer has a nitrogen concentration of 0.1% by weight or more at the depth of 2% of the diameter Da of the rolling element. Accordingly, the nitrogen concentration at the depth of 2% of Da is 0.1% by weight or more, preferably 0.3% by weight or more. The austenite which has retained after hardening is preferably eliminated as much as possible before tempering by subjecting the material to sub-zero treatment or mechanical hardening such as shot peening and ball peening so that it is induction-transformed to martensite rather than being directly decomposed by tempering because an even higher impact resistance can be obtained. More preferably, HRC 62 or more is secured.

The critical significance of the case where the foregoing rolling element is a ball will be described hereinafter.

Embodiment in which the Rolling Element is Formed by a Steel Having a Cr Content of from 5% to 16%, both Inclusive, (the sum of the Content of C and N is from 0.45% to 0.90%, both Inclusive) as a Matrix and a Dense Nitride Layer Having Hv 900 or More is Formed on the Surface of the Rolling Element When the rolling element is formed by a matrix having a Cr content of 5% or more and has a nitride layer having Hv 900 or more and containing fine Cr nitride particles formed on the surface thereof, the rolling element or races is less liable to damage during vibration, enhancing the fretting durability. Even when a bearing steel having a Cr content of less than 5%, such as SUJ2 is subjected to nitriding, the resulting hardness Hv falls below 900, exerting little or a very small, if any, effect of inhibiting fretting. Thus, a steel material having a Cr content of 5% or more, preferably 8% or more, is used. However, when the Cr content is too great, its relation with C and N contents can cause the production of coarse eutectic carbide particles, resulting in the deterioration of stillness. Accordingly, the upper limit of Cr content is defined to be 16%. In addition to Cr, nitride-forming elements such as Mo, V and W may be added in combination. The core of the material tends to soften by tempering action accompanying nitriding. For the reason described later, the core, too, needs to be provided with a sufficient hardness. To this end, the sum of the content of C and N is defined to be 0.45% or more so that a sufficient hardness can be obtained after nitriding. When a steel material having a large content of carbon, such as SUS440C is used, coarse eutectic carbide particles are produced, causing the deterioration of stillness. Accordingly, the sum of the content of C and N is from 0.45% to 0.90%, both inclusive. In order to inhibit the production of eutectic carbide particles, the content of C is preferably 0.6% or less.

Embodiment in which the Hardness HRC of the Core of the Rolling Element is 57 or More and the Carbide Particles Contained in the Rolling Element Have a Size of 5 $\mu$m or Less in Terms of Major Diameter As previously mentioned, nitriding is normally effected at a temperature of from 400° C. to 600° C. During this procedure, the core undergoes tempering to soften. In general, nitriding involves the formation of a compound layer on the surface of the material. A nitrogen diffusion-hardened layer is formed at the position deeper than the compound layer. Since nitriding causes the formation of this diffusion-hardened layer, the coating film has a strong adhesion to the matrix and thus can hardly be peeled off from the matrix. However, when the bearing is used under a high face pressure, it is subject to a great shear stress at the position deeper than the nitride layer. If the position has no sufficient strength, the bearing can undergo plastic deformation that causes destruction of the surface hardened layer. For the reason described above, the hardness of the core is defined to be 57 or more in terms of HRC. The hardness gradually lowers towards the core. However, the hardness gradually approaches a certain value. Accordingly, the term "core hardness" as used herein is meant to indicate the asymptotic value. The nitriding temperature is preferably from 400° C. to 460° C. When coarse carbide particles are present, a desired precision can hardly be obtained during lapping. Accordingly, the size of carbide particles is defined to be 5 $\mu$m or less in terms of major diameter (maximum diameter).

Embodiment in which the Nitride Layer comprises a Compound Layer and a Diffusion Layer and the Thickness of the Compound Layer is From 0.075*2% Da to 1.0*2% Da, both Inclusive Since nitriding causes the formation of a compound layer and a diffusion layer, the coating film has a strong adhesion to the matrix and can hardly be peeled off from the matrix. However, when the bearing is subject to a great shear stress at the position deeper than the nitride layer as in rolling bearing, it undergoes peeling. Accordingly, the core hardness needs to be considered as previously mentioned. The compound layer (white layer) is made of a dense nitride such as $(Fe, Cr)_{2-4}N$, $CrN$ and $Cr_2N$ and exhibits excellent surface properties. During nitriding, a porous compound layer is formed in the vicinity of the surface of the material. By adjusting the margin for lapping to allow indentations having an opening size of 5 $\mu$m or less to be retained in a proportion of at least one per 300 $\mu m^2$, the pores can retain the lubricant and exert a micro EHL effect, having better effect on fretting durability, acoustic durability, etc. When the thickness of the compound layer increases, it not only adds to the treatment cost but also impairs the physical properties characteristic to steel, e.g., reduces the impact resistance. On the contrary, when the thickness of the compound layer falls below 0.075*2% Da, the nitride layer is lost one some area (insufficient margin) or become uneven after lapping following heat treatment, impairing the fretting durability and acoustic durability. Accordingly, the thickness of the compound layer is defined to be from 0.075*2% Da to 1.0*2% Da, both inclusive. However, this restriction is limited to the case where the race is free of carbonitrided layer on at least the raceway surface as previously mentioned.

Embodiment in which the Rolling Element is Subjected to Lapping to Have a Surface Roughness (Ra) of 0.003 $\mu$m or Less The surface roughness of the rolling element which has been nitrided is very high as compared with that of ball bearing for use in HDD or the like. Therefore, the rolling element which has been nitrided cannot be used as it is from the standpoint of stillness. Accordingly, the rolling element which has been nitrided is subjected to lapping, and then finished to a precision of as high as JIS 3 grade or more. In particular, when the surface roughness (Ra) of the rolling element is 0.003 $\mu$m or less, it exerts a remarkably high effect on stillness and fretting durability.

Embodiments of implication of the invention will be described hereinafter.

FIG. 1 is a sectional view illustrating a ball bearing according to the present embodiment of the invention. The ball bearing of FIG. 1 comprises a plurality of rolling elements (ball) 3, an inner race 1 disposed inwardly of said rolling elements, and an outer race 2 disposed outwardly of said rolling elements. The rolling elements 3 are guided to roll while being supported between the inner race 1 and the outer race 2. The inner race 1 and the outer race 2 each have a rolling groove formed thereon for guiding the rolling elements 3. The rolling elements 3 are arranged equally apart along the foregoing rolling groove by a cage 4. Nitrogen atom (N) is present on the rolling element 3.

Ball bearings of examples prepared as embodiments of implication of the invention and comparative examples were all evaluated for stillness and durability in the form of ball bearing 695 (JIS Designation No.).

TABLE 1

| Example/ Comparative Example | Symbol | C (wt-%) | Cr (wt-%) | N (wt-%) | C + N (wt-%) |
|---|---|---|---|---|---|
| Example | a | 0.45 | 13.01 | 0.14 | 0.59 |
|  | b | 0.65 | 12.84 | — | 0.65 |
|  | c | 0.86 | 8.32 | — | 0.86 |
|  | d | 0.39 | 15.98 | 0.09 | 0.48 |
|  | e | 0.71 | 5.39 | — | 0.71 |
| Comparative Example | f | 1.03 | 17.32 | — | 1.03 |
|  | g | 0.79 | 4.32 | — | 0.79 |
|  | h | 0.35 | 4.99 | — | 0.35 |
|  | i | 1.02 | 1.51 | — | 1.02 |
|  | j | 0.05 | 18.56 | — | 0.05 |

Table 1 shows the components of the matrix constituting the rolling element. In Table 1, Examples a to e satisfy all the foregoing requirements. Comparative Examples f, h, i and j don't satisfy the requirement for Cr content and (C+N) content. Comparative Example g doesn't satisfy the requirement for Cr content. Referring to the production of the rolling element, a coarse sphere was formed. The sphere was hardened, and then polished to a desired size before nitriding. Referring to nitriding, gas nitriding was effected at a temperature of from 410° C. to 460° C. for 24 to 48 hours. With the expanded size developed by nitriding as final margin, the material was then finished.

surface roughness was determined by measuring 10 samples (n=10) using a talisurf type ball unit produced by Tailor-Hobson Inc., and then averaging the measurements.

In Table 2, all Examples A-1 to A-6 satisfy the foregoing requirements. Comparative Example B-1, which uses the steel of Example b, doesn't satisfy the requirement for the thickness of compound layer. Comparative Examples B-2 and B-3, which use the steel of Comparative Example f, don't satisfy the requirements for the thickness of compound layer, the size of carbide particles and the surface roughness. Comparative Example B-4, which uses the steel of Comparative Example g, doesn't satisfy the requirements for the thickness of compound layer and the surface hardness. Comparative Example B-5, which uses the steel of Comparative Example h, doesn't satisfy the requirements for the thickness of compound layer, the surface hardness and the core hardness. Comparative Examples B-6 and B-7, which use the steel of Comparative Example i, don't satisfy the requirements for the thickness of compound layer, the surface hardness and the core hardness. Comparative Example B-8, which uses the steel of Comparative Example j, doesn't satisfy the requirements for the thickness of compound layer and the core hardness. Comparative Example B-9 concerns a hybrid bearing comprising rolling elements made of ceramics ball.

Prior to evaluating the bearing for function, the nitride layer was subjected to evaluation of reliability under the following conditions. As the specimen there was used a

TABLE 2

| Example/ Comparative Example | No. | Symbol for kind of steel | Surface hardness (Hv) | Compound layer 2% Da value | Core hardness (HRC) | Carbide ($\mu$m) | Reliability test | Surface roughness Ra ($\mu$m) | Initial sound | Acoustic durability | Fretting durability | Impact resistance (kgf) |
|---|---|---|---|---|---|---|---|---|---|---|---|---|
| Example | A-1 | a | 1,232 | 0.55 | 59.9 | 1.1 | ○ | 0.0013 | 1.01 | 0.03 | 0.06 | 0.0 |
|  | A-2 | a | 1,185 | 0.125 | 59.9 | 1.1 | ○ | 0.0012 | 1.08 | 0.08 | 0.07 | 0.5 |
|  | A-3 | b | 1,145 | 0.625 | 59.6 | 2.5 | ○ | 0.0019 | 1.18 | 0.05 | 0.09 | 0.0 |
|  | A-4 | c | 1,067 | 0.825 | 60.1 | 4.7 | ○ | 0.0026 | 1.29 | 0.18 | 0.14 | 1.0 |
|  | A-5 | d | 1,257 | 0.425 | 57.2 | 1.3 | ○ | 0.0013 | 1.07 | 0.08 | 0.09 | 0.0 |
|  | A-6 | e | 928 | 0.95 | 57.1 | 1.7 | ○ | 0.0014 | 1.03 | 0.14 | 0.29 | 1.0 |
| Comparative Example | B-1 | b | 1,204 | 1.1 | 59.6 | 2.5 | ○ | 0.0019 | 1.13 | 0.08 | 0.06 | 3.0 |
|  | B-2 | f | 1,226 | 0.4 | 59.7 | 13.8 | ○ | 0.0039 | 2.31 | 0.43 | 0.39 | 0.5 |
|  | B-3 | f | 803 | — | — | 13.8 | — | 0.0092 | 2.91 | 1.06 | 0.78 | 0.5 |
|  | B-4 | g | 881 | 1.2 | 57.0 | 2.8 | ○ | 0.0022 | 1.12 | 0.87 | 0.84 | 3.5 |
|  | B-5 | h | 897 | 0.8 | 52.1 | 0.9 | x | — | — | — | — | — |
|  | B-6 | j | 755 | — | 42.3 | 1.0 | ○ | 0.0028 | 1.21 | 1.19 | 1.10 | 0.5 |
|  | B-7 | i | 856 | — | — | 1.0 | — | 0.0024 | 1.00 | 1.00 | 1.00 | 0.0 |
|  | B-8 | j | 1,287 | 0.225 | 20.5 | — | x | — | — | — | — | — |
|  | B-9 | k | 1,678 | — | — | — | — | 0.0012 | 1.11 | 0.08 | 0.11 | 7.0 |

The quality of the finished rolling elements are set forth in Table 2. Among these properties, the surface hardness was determined by measuring the hardness of the position 5 $\mu$m below the surface under a load of 50 g for 10 samples (n=10), and then averaging the measurements. The thickness of the compound layer was determined by measuring the thickness of white layer (meaning nitride layer) observed on the steel material etched with a solution of ferric chloride in hydrochloric acid for 10 samples (n=10), and then averaging the measurements. The core hardness was determined by measuring the Vickers hardness of the material under a load of 1 kgf for 10 samples (n=10), and then averaging the measurements. The average value was then reduced to Rockwell hardness. The size of carbide was determined by observing the core structure at a magnification of 3,000 over 3,000 $\mu$m$^2$ under SEM, analyzing the image, extracting the carbide particles by 10% from the largest size, and then averaging the major diameter of these carbide particles. The thrust disc specimen having a size of 60 mm$\phi$×6 mm. The specimen was rocked at an angle of 15° and a frequency of 10 Hz under a face pressure of 285 kgf/mm$^2$ two million times. The specimen was then checked for damage to see if it can be applied. Among those evaluated, Comparative Examples B-5 and B-8 underwent damage on the nitride layer due to the shortage of core strength for supporting the nitride layer and thus were judged inapplicable. Thus, these comparative examples were processed nor more for preparation and evaluation of bearing. Comparative Example B-6 was made of SUJ2 and thus had little compound layer (white layer) produced thereon. Therefore, Comparative Example B-6 had a deeper diffusion-hardened layer than other examples. Since the hardened layer was formed to a position far deeper than the maximum shear stress position, the nitride layer was not damaged. The other specimens had a sufficient core strength and thus had no special problems.

Those judged inapplicable from the foregoing results were excluded for the preparation of small diameter ball bearing 695. For the races, SUJ2 was hardened, and then tempered at a temperature of from 220° C. to 240° C. for 2 hours. As the cage there was used a plastic cage. As the bearing lubricant there was used a mineral oil-based grease.

The bearing was then evaluated for performance such as initial sound, acoustic durability, fretting durability and impact resistance. The results of evaluation are set forth in Table 2. For the evaluation of initial sound, sound pressure was measured during the operation of the foregoing ball bearing at a pilot pressure of 1.2 kgf and 1,800 rpm. In Table 2, the value obtained by averaging over 10 samples (n=10) was given as a relative value taking the average of measurements of Comparative Example B-7, which is made of SUJ2 alone, as 1. For the evaluation of the acoustic durability, the bearing was operated at a pilot pressure of 1.2 kgf, a rotary speed of 7,200 rpm and a temperature of 70° C. for 500 hours, and then measured for sound pressure at a pilot pressure of 1.2 kgf and a rotary speed of 1,800 rpm. The measurements were average over 10 samples (n=10). The average was shown as a relative value taking that of Comparative Example B-7, which is made of SUJ2 alone, as 1. For the evaluation of fretting durability, measurement was made for 10 samples (n=10) under the conditions described below. These samples were then measured for sound pressure at a pilot pressure of 1.2 kgf and a rotary speed of 1,800 rpm. The averaged value was shown as a relative value taking that of Comparative Example B-7, which is made of SUJ2 alone, as 1. For the evaluation of impact resistance, the ball bearing was subject to a pure axial load of 1.2 kgf, 5 kgf, and 5 kgf plus 0.5 kgf, 5 kgf plus 0.5 kgf×2, so forth. The pure axial load at which the sound pressure level is 30 mG (axial vibration acceleration) higher than that measured before test is defined as impact resistance load. The impact resistance load which was lower than that of Comparative Example B-7, which is made of SUJ2 alone, as 0 was shown in the table.

Evaluation of Fretting Durability

Pilot pressure: 1.2 kgf

Rocking conditions: 2°, 27 Hz

Repetition of rocking: 300,000 times

As can be seen in Table 2, all the rolling elements of the examples according to the present embodiment had a nitride layer having Hv of 900 or more formed thereon and a core hardness HRC of 57 or more and contained carbide particles having a size of 5 $\mu$m or less and thus are extremely excellent in reliability and various functions. On the contrary, the rolling element of Comparative Example B-1 had a nitride layer formed on the surface thereof to a large thickness and thus exhibited a slightly poorer impact resistance than those of the examples. The rolling element of Comparative Example B-2 exhibited a good impact resistance but a slightly poorer surface smoothness than those of the examples due to the effect of coarse eutectic carbide particles contained in the matrix. As a result, the rolling element of Comparative Example B-2 leaves something to be desired in the improvement of various functions. Comparative Example B-3 is the same as Comparative Example B-2 except that nitriding was not effected. However, since the difference in hardness between carbide and matrix was remarkably great, the resulting surface roughness was extremely great, giving a great initial sound in particular. In Comparative Example B-4, a matrix having a Cr content of less than 5% was subjected to nitriding. The rolling element of Comparative Example B-4 exhibited a poor acoustic durability, a fretting durability and insufficient surface properties as compared with those of the examples. In Comparative Example B-6, SUJ2 was nitrided. However, since the rolling element of Comparative Example B-6 had little compound layer formed thereon and had a Cr content of less than 5% and thus are inferior to the examples in various functions. Comparative Example B-7 was about SUJ2 steel ball. As previously mentioned, the rolling element of Comparative Example B-7 leaves something to be desired in acoustic durability and fretting durability. Comparative Example B-9 was about a hybrid bearing comprising ceramics ball ($Si_3N_4$). The hybrid bearing of Comparative Example B-9 was extremely excellent in acoustic durability and fretting durability but had a very poor impact resistance.

Figure 2:
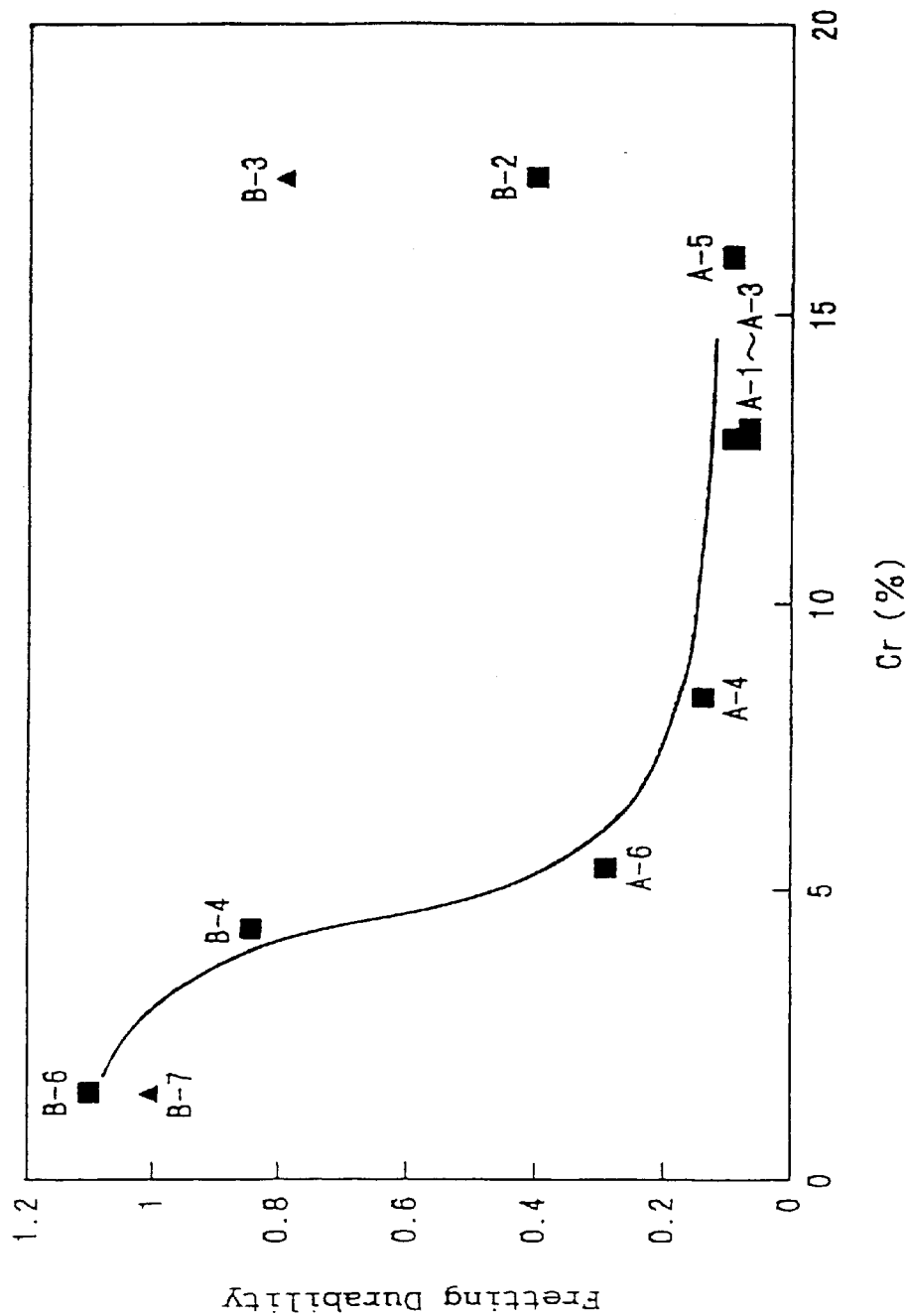
FIG. 2 is a diagram illustrating the relationship between Cr content and fretting durability.

FIG. 2 illustrates the relationship between the Cr content and the fretting durability of the rolling element. As can be seen in FIG. 2, those having a Cr content of 5% or more have a great fretting durability.

Figure 3:
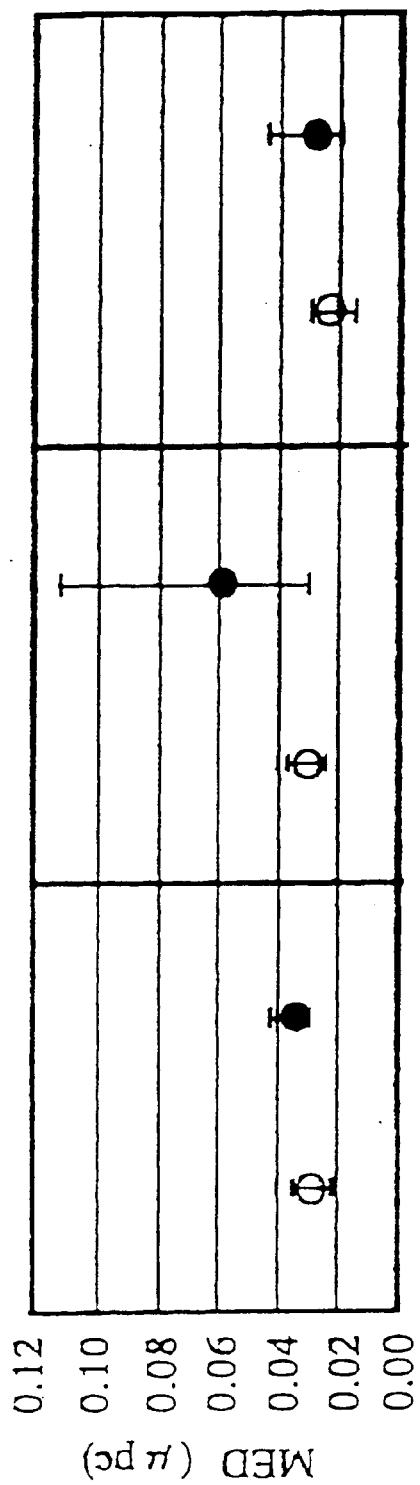
FIG. 3 is a diagram illustrating the change of waviness of rolling element between before and after fretting durability test.

FIG. 3 illustrates the measurements of waviness of the rolling elements of Example A-1 and Comparative Examples B-7 and B-9 before and after fretting durability test. As expected, Comparative Example B-7, which uses SUJ2, showed a remarkable deterioration of waviness after test. On the contrary, the rolling elements of Example A-1 and Comparative Example B-9, which constitutes a hybrid bearing, were extremely excellent in this respect, demonstrating that the deterioration of acoustic properties due to fretting is attributed to the life of the rolling element.

Figure 4:
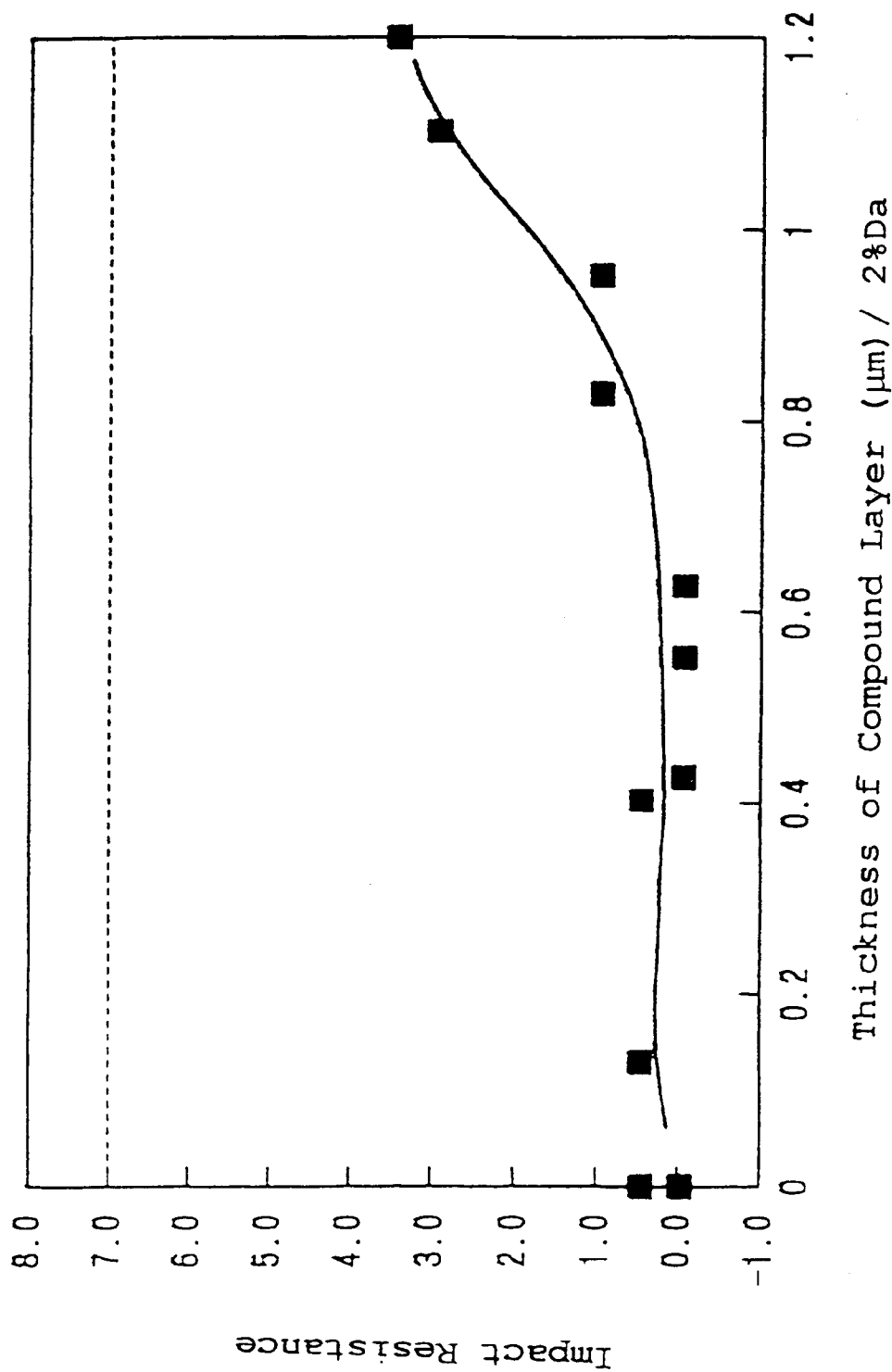
FIG. 4 is a diagram illustrating the relationship between the thickness of compound layer and the impact resistance.

FIG. 4 illustrates the relationship between the compound layer (white layer) formed by nitriding and the impact resistance of rolling element (broken line: B-9 (ceramic ball)). The smaller the value at the ordinate is, the better the impact resistance is. It is obvious that when the thickness of the compound layer exceeds 2% (about 40 $\mu$m) of the diameter (Da) of the rolling element, the impact resistance of the rolling element is deteriorated.

TABLE 3

| Example/ Comparative Example | No. | Change of pilot pressure load at 0° C. to 70° C. (kgf) | Pilot pressure load (kgf) at 70° C. |
|---|---|---|---|
| Example | A-1 | 0.1 | 0.9 |
| Comparative Example | B-7 | 0.3 | 1.1 |
| Comparative Example | B-9 | 1.2 | 0.0 |

Table 3 shows the results of the effect of the difference in linear expansion coefficient among Example A-1 and Comparative Examples B-7 and B-9 on pilot pressure calculated using the linear expansion coefficient of matrix. The calculation was made for the temperature range of from 0° C. to 70° C. on the supposition that the bearing housing is made of ferrite stainless steel ($10.4 \times 10^{-6}$/° C.), the pilot pressure at 20 C. is 0.8 kgf and the residual radial gap is 16.5 $\mu$m. As can be seen in Table 3, the bearing of the example, which comprised a steel as matrix and was modified only on the surface thereof, was little liable to the effect of temperature on pilot pressure and was extremely excellent in the maintenance of rigidity against release of pilot pressure as in Comparative Example B-7, which was made of SUJ2 alone. On the contrary, the hybrid bearing of Comparative Example B-9, which was made of $Si_3N_4$ ceramics ball, underwent complete release of pilot pressure at a temperature of 70° C. as expected.

TABLE 4

| Example/ Comparative Example | No. | Specific resistivity ($\Omega \cdot$ cm) | Percent defective of acoustic properties |
|---|---|---|---|
| Example | A-1 | ~$10^{-5}$ | 0.4 |
| Comparative Example | B-7 | ~$10^{-5}$ | 1.0 |
| Comparative Example | B-9 | $10^{13}$~$10^{14}$ | 8.7 |

Table 4 illustrates the measurements of specific resistivity of Example A-1 and Comparative Examples B-7 and B-9. Table 4 also shows the results of percent defective of acoustic properties of 1,000 samples of each of these examples. For the measurement of specific resistivity, a specimen having a size of 80 mm×50 mm×20 mm which had been treated in the same manner as the rolling element was used. The measurement was carried out by a four-probe method specified by JIS. The percent defective of acoustic properties was represented as a relative value taking that of Comparative Example B-7, which was made of SUJ2 alone, as 1. As can be seen in Table 4, Example A-1 exhibited a small specific resistivity and a good electrical conductivity. For reference, the specific resistivity of $Si_3N_4$ ceramic ball of the hybrid bearing of Comparative Example B-9 is shown. Since $Si_3N_4$ is an insulating material, the ceramics ball has an extremely high resistivity and a low electrical conductivity. As can be seen in the percent defective of acoustic properties shown in Table 4, Example A-1 exhibits a remarkably low percent defective of acoustic properties. This is presumably attributed to the synergistic effect developed by the reduction of percent defective due to attraction of dust by the electrical conductivity of the rolling element of the example and the reduction of flaw on the ball by the formation of the nitride layer having a high hardness on the surface of the rolling element. On the contrary, the hybrid bearing of Comparative Example B-9 showed an increase of percent defective attributed to the electrostatic attraction of dust.

The materials set forth in Table 5 were each header-worked, and then deburred or cut to prepare a raw ball which was then hardened. The materials A and B constitute comparative examples while the materials C to E constitute examples.

TABLE 5

| Symbol | C | Cr | N | Others | Remarks |
|---|---|---|---|---|---|
| A | 0.79 | 3.97 | — | Mo: 4%, V: 1% | M50 |
| B | 1.04 | 17.21 | — | — | SUS440C |
| C | 0.68 | 12.87 | — | — | |
| D | 0.45 | 13.04 | 0.13 | — | |
| E | 0.33 | 17.33 | 0.18 | Mo: 2%, Co: 3% | |

The material which had been hardened exhibited a sphericity of from 8 to 20 μm and a mutual diameter difference of from 8 to 20 μm. In order to finish the material to a high precision ball having a grade of 3 (G3) or higher according to JIS B 1501, a margin of about 100 μm is required. As a result, no nitride layer can be retained on all the surface of the steel ball. Therefore, the material which had been hardened was finished to a predetermined precision, and then subjected to nitriding and finishing (lapping). Referring to nitriding, a steel ball made of material C set forth in Table 1 which had been hardened, finished to a sphericity of 1 μm, and then subjected to preliminary experiment showed a sphericity of from 6 to 8 μm and a mutual diameter difference of from 7 to 9 μm after salt bath nitriding (550° C.×3 hours) and thus required a margin of about 100 μm. As a result, it was judged that no nitride layer can be retained on all the surface of the steel ball. Thus, this salt bath nitriding was excluded for evaluation. Further, the foregoing steel ball was subjected to gas nitriding at a temperature of 480° C. for 12 hours. However, a nitride layer was not formed uniformly on all the surface of the steel ball, showing uneven nitriding, partly because the steel ball had a great Cr content. This nitriding process, too, was excluded for evaluation. Accordingly, as the nitriding process of the present embodiment there was used the foregoing Nv nitriding process (Daido Hoxan Inc.), which allows nitriding at a lower temperature than the conventional nitriding processes. The same examination was conducted at Nv nitriding process (400° C. to 480° C.×12 to 48 hours). As a result, the sphericity and mutual diameter difference were as good as from 1.1 to 1.5 μm and from 1.5 to 2.0 μm, respectively.

Figure 5:
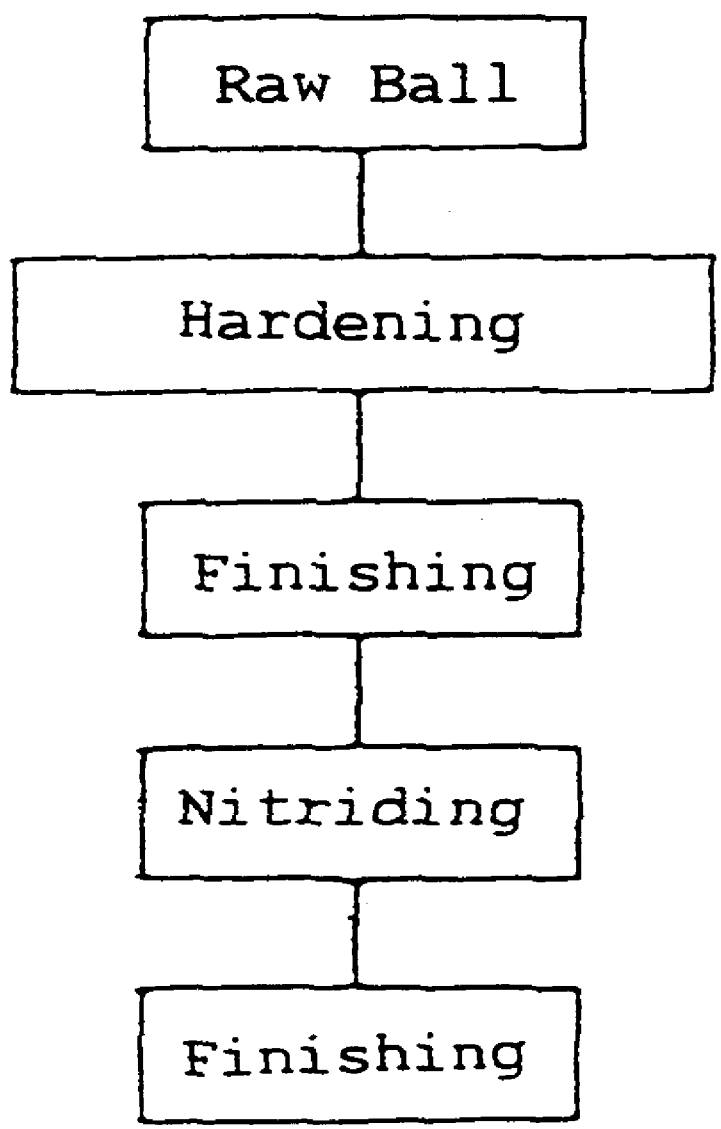
FIG. 5 is a schematic diagram illustrating the process for the production of the rolling element of the invention.

FIG. 5 illustrates the outline of process for production of rolling element. Table 6 gives the results of the quality of rolling elements prepared by the foregoing preparation process. The lower the nitriding temperature is, the denser and harder is the resulting nitride layer. The nitride layer thus formed showed a tendency for enhancement of surface smoothness and waviness after lapping. Accordingly, nitriding was effected at a temperature of from 4000° C. to 420° C. for 48 hours. The measurement of sphericity, average diameter and surface roughness was effected according to JIS B 1501. In Table 6, the value of sphericity is the maximum value of 10 samples. The value of mutual diameter difference is the difference between the maximum value and the minimum value of average diameter of 10 samples. The value of surface roughness is determined by averaging the values of 10 samples. For the evaluation of ununiformity in the nitride layer, 10 samples were each examined at a proper section. After etched with a hydrochloric acid solution of ferric chloride, the balls were each observed for the thickness of the resulting compound layer at four points, i.e., 0°, 90°, 180° and 270° at a magnification of 1,000 under an optical microscope. The difference between the minimum thickness and the maximum thickness was determined. The value is set forth as average in Table Table 6. For the measurement of the thickness of compound layer, 10 samples were measured for each example. The measurement was effected at four points. The measurements were then averaged. The average value is set forth in Table 6. For the measurement of surface hardness and core hardness, a micro Vickers hardness meter was used. 10 samples for each example were each measured for hardness of compound layer positioned at a depth of 5 μm below the surface and core hardness. The measurements were then averaged. The average value is set forth in Table 6. For the measurement of the size of carbide particles, the core structure was observed at a magnification of 3,000 over 3,000 μm² under SEM. The image was then analyzed. The carbide particles were then extracted by 10% from the largest size. The major diameter of these carbide particles were then averaged. The average value is set forth in Table 6.

TABLE 6

| | | | Precision of semi-finished ball | | Quality of finished ball | | | | | | | |
|---|---|---|---|---|---|---|---|---|---|---|---|---|
| No. | Material | Heat treatment conditions | Sphericity ($\mu$m) | Mutual diameter difference ($\mu$m) | Sphericity ($\mu$m) | Mutual diameter difference ($\mu$m) | Surface roughness ($\mu$m) | Ununi- formity of nitride layer ($\mu$m) | Surface hardness ($\mu$m) | Thickness of layer/Da ratio (%) | Core hard- ness ($H_RC$) | Carbide ($\mu$m) |
| X-1 | D | 1,060° C. hardening, −80° C. sub-zero, 160° C. tempering | 2.8 | 2.9 | 0.037 | 0.039 | 0.0022 | 3.2 | 1,190 | 1.3 | 59.4 | 1.0 |
| X-2 | D | 1,060° C. hardening, −80° C. sub-zero, 160° C. tempering | 1.0 | 1.0 | 0.020 | 0.021 | 0.0017 | 3 or less | 1,210 | 1.4 | 59.4 | 1.0 |
| X-3 | D | 1,060° C. hardening, −80° C. sub-zero, 160° C. tempering | 0.2 | 0.2 | 0.016 | 0.016 | 0.0012 | 3 or less | 1,340 | 1.5 | 59.4 | 1.0 |
| X-4 | D | 1,060° C. hardening, −80° C. sub-zero, 460° C. tempering | 0.2 | 0.2 | 0.014 | 0.014 | 0.0013 | 3 or less | 1,300 | 1.6 | 59.9 | 1.0 |
| X-5 | E | 1,000° C. hardening, −80° C. sub-zero, 160° C. tempering | 0.2 | 0.2 | 0.014 | 0.014 | 0.0012 | 3 or less | 1,240 | 1.3 | 59.1 | 0.9 |
| X-6 | C | 1,060° C. hardening, −80° C. sub-zero, 160° C. tempering | 0.2 | 0.2 | 0.017 | 0.018 | 0.0019 | 3 or less | 1,160 | 1.5 | 58.7 | 2.3 |
| Y-1 | A | 1,050° C. hardening, 550° C. tempering | 0.2 | 0.2 | 0.020 | 0.022 | 0.0037 | 3 or less | 1,150 | 1.6 | 63.5 | 8.3 |
| Y-2 | B | 1,060° C. hardening, −80° C. sub-zero, 160° C. tempering | 0.2 | 0.2 | 0.021 | 0.023 | 0.0041 | 3 or less | 1,160 | 1.6 | 59.1 | 13.4 |
| Y-3 | B | 1,060° C. hardening, | 0.2 | 0.2 | 0.029 | 0.031 | 0.0045 | 3 or less | 1,120 | 1.0 | 58.1 | 13.4 |
| Y-4 | D | 1,060° C. hardening, −80° C. sub-zero, 160° C. tempering | 4.5 | 4.7 | 0.03 | 0.091 | 0.0042 | 5.1 | 1,100 | 0.5 | 59.4 | 1.0 |
| Y-5 | B | 1,060° C. hardening, −80° C. sub-zero, 160° C. tempering | 5.3 | 5.4 | 0.093 | 0.099 | 0.0098 | 5.7 | 1,000 | 0.2 | 58.1 | 13.4 |

As can be seen in Table 6, the precision of a grade 3 or more cannot be attained unless the sphericity of the semi-finished ball to be nitrided is 3.0 $\mu$m or less. For example, Comparative Examples B-4 and B-5 in Table 6 are about semi-finished balls having a sphericity of greater than 3.0 $\mu$m. Since a nitride layer is formed after the shape of the semi-finished ball, the nitride layer is ununiformly cut during finishing. As a result, stress is ill-balanced during cutting, giving an adverse effect on the shape or waviness and hence resulting in the difficulty in the accomplishment of the desired precision. As described later, when the nitride layer is ununiform, it has an adverse effect on the properties of the bearing, too. Thus, the ununiformity of the nitride layer is preferably minimized. Comparative Example B-3 is about the production of a semi-finished ball free from tempering after hardening. Comparative Example B-2 is about the production of a semi-finished ball involving tempering after hardening. The latter was excellent in precision.

The former had a poor precision and thus took more time to finish. This is presumably because the residual stress accumulated during hardening is released during nitriding, giving an adverse effect on precision. This can be seen in the fact that Example A-4, which involves tempering at a higher temperature than nitriding, has a slightly higher precision than Example A-3. This presumably demonstrates that the residual stress has a strong effect on the quality of nitrided steel ball, which is intended by the invention.

From the standpoint of material, the materials D and E in Table 5, which have nitrogen partly replaced by a metal, comprised extremely fine carbide particles. Since such carbide particles can be relatively easily dissolved in the matrix during heat treatment, the resulting effective Cr content is inevitably great, making it possible to obtain a product having an extremely high surface hardness. On the contrary, the material B doesn't satisfy the foregoing relationship C $\% \leq -0.05$Cr $\% + 1.41\%$. Thus, extremely large eutectic carbide particles are produced during solidification step, decreasing the effective Cr content. The resulting product has a slightly lower surface hardness than those of the examples. Further, since a large number of coarse eutectic carbide particles are present in the material, the resulting product is slightly inferior to those of the examples in surface smoothness, thus leaving something to be desired in stillness, too, as described later. Though omitted from the table, when the thickness of the compound layer in the nitride layer exceeded 2% of the diameter of the rolling element, the drop of impact resistance was confirmed. This case was excluded for evaluation. The rolling elements of Examples X-3 to X-5 were each measured for ball waviness. As a result, these rolling elements showed a waviness as extremely low as 40 npc or less in M.B (5 to 30 peaks) or 83 npc or less in $H^{-B}$ (30 to 160 peaks).

Subsequently, a small diameter ball bearing 695 was produced from the nitrided steel ball set forth in Table 6. For the races, SUJ2 was hardened, subjected to sub-zero treatment at a temperature of −90° C. for 30 minutes from the standpoint of impact resistance, and then subjected to tempering at a temperature of from 160° C. to 240° C. for 2 hours to have γR (retained austenite content) of 6 vol % or less. As the cage there was used a plastic cage. As the bearing lubricant there was used a mineral oil-based lubricant. For comparison, a rolling element made of conventional SUJ2 and a rolling element made of silicon nitride ceramics were evaluated, too.

The bearings thus produced were then evaluated for initial sound, acoustic durability, fretting durability, impact resistance, bar-in properties, etc. The results of evaluation are set forth in Table 7. For the evaluation of initial sound, the axial vibration acceleration (G value) developed when the foregoing ball bearing is operated at a pilot pressure of 1.2 kg and a rotary speed of 1,800 rpm was measured. 10 samples were measured. The measurements were then averaged. The average value is set forth in Table 7 as a relative value taking that of Comparative Example 4, which is made of SUJ2 alone, as 1. For the evaluation of acoustic durability, the ball bearing was operated at a pilot pressure of 1.2 kgf, a rotary speed of 7,200 rpm and a temperature of 70° C. for 1,000 hours, and then measured for axial vibration acceleration (G value). Similarly, the values of 10 samples were averaged. The average value is set forth in the table as a relative value taking that of Comparative Example 4, which is made of SUJ2 alone, as 1. For the evaluation of fretting durability, 10 samples were measured for axial vibration acceleration under the conditions described later. The measurements were then averaged. The average value is set forth in the table as a relative value taking that of Comparative Example 4, which is made of SUJ2 alone, as 1. For the evaluation of impact resistance, the ball bearing was subject to a pure axial load of 1.2 kgf, 5 kgf, and 5 kgf plus 0.5 kgf, 1.0 kgf, 1.5 kgf, and so forth. The pure axial load at which the sound pressure level is 30 mG (G value) higher than that measured before test is defined as impact resistance load. The load value increase or drop from the impact resistance load of Comparative Example 4, which is made of SUJ2 alone, is set forth in the table. For the evaluation of bar-in properties (high temperature aging test), the ball bearing was allowed to stand at a pilot pressure of 2.5 kgf and a temperature of 70° C. for 1 week, and then measured for axial vibration acceleration (G value). The values of 10 samples were then averaged. The average value is set forth in the table as a relative value taking that of Comparative Example 4, which is made of SUJ2 alone, as 1.

Evaluation of Fretting Durability

Pilot pressure: 1.2 kgf

Rocking conditions: 2°, 27 Hz

Repetition of rocking: 300,000 times

TABLE 7

| Example/ Comparative Example | Rolling element | Initial sound | Acoustic durability | Fretting durability | Impact resistance (kgf) | High temperature aging test |
|---|---|---|---|---|---|---|
| Example 1 | X-1 | 1.07 | 0.13 | 0.09 | 0.0 | 0.62 |
| Example 2 | X-3 | 1.01 | 0.05 | 0.06 | 0.0 | 0.53 |
| Example 3 | X-4 | 0.99 | 0.06 | 0.06 | 0.0 | 0.49 |
| Example 4 | X-5 | 1.02 | 0.08 | 0.07 | 0.0 | 0.50 |
| Comparative Example 1 | Y-1 | 1.98 | 0.36 | 0.25 | 0.5 | 0.53 |
| Comparative Example 2 | Y-2 | 2.29 | 0.41 | 0.37 | 0.5 | 0.55 |
| Comparative Example 3 | Y-5 | 2.72 | 0.59 | 0.43 | 0.5 | 0.91 |
| Comparative Example 4 | SUJ2 | 1.00 | 1.00 | 1.00 | 0.0 | 1.00 |
| Comparative Example 5 | $Si_3N_4$ | 1.11 | 0.08 | 0.11 | 7.0 | 0.54 |

As can be seen in Table 7, the stillness and durability of the examples are extremely excellent as compared with that of Comparative Example 4, which is made of SUJ2 alone. On the contrary, Comparative Examples 1 and 2 are the same as the examples in production process but comprise eutectic carbide particles having a size of greater than 5 μm incorporated therein and a slightly poorer surface smoothness than the examples. Thus, when the ball bearings of Comparative Examples 1 and 2 are operated, these carbide particles interfere with the contact area, making it impossible to obtain a good stillness. Comparative Example 3 is about a semi-finished ball showing a sphericity of 5 μm or more before nitriding. As previously mentioned, such a semi-finished ball can hardly provide the quality of finished steel ball itself and has an extremely poor stillness. Further, the steel ball has an ununiform nitride layer formed on the surface thereof and has an ununiform residual stress distribution. Therefore, the steel ball is liable to change of surface waviness with time and thus is inferior to that of the examples in stillness after high temperature aging test. Comparative Example 4 is about a conventional ball bearing made of SUJ2. The ball bearing is extremely excellent in stillness but is extremely inferior to the examples in various durabilities. Comparative Example 5 is about a hybrid bearing comprising rolling elements made of silicon nitride ceramics. The hybrid bearing of Comparative Example 5 is excellent in stillness, acoustic durability, fretting durability, etc. However, the silicon nitride ceramics has an extremely high longitudinal elastic modulus and thus has an extremely poor impact resistance. The silicon nitride ceramics has a specific resistivity of as extremely great as $10^{13}$ to $10^{14}$ Ω.cm and thus can easily attract foreign matters electrostatically, causing dust noise or troubles during transportation at production step. Further, the silicon nitride ceramics has a linear expansion coefficient of as very small as $2.8 \times 10^{-6}/°$ C. and thus is liable to change of pilot pressure with temperature change. This causes torque change or, in extreme cases, complete release of pilot pressure.

The various examples exhibit a specific resistivity of $10^{-5}$ Ω.cm or less, the order of which is almost the same as that of SUJ2. Further, the various examples show a slight drop of linear expansion coefficient ($10.8 \times 10^{-6}/°$ C. in the case of material) from that of SUJ2 ($12.5 \times 10^{-6}/°$ C.). As the material of bearing there is often used ferrite stainless steel ($10.4 \times 10^{-6}/°$ C.). In the case of this material, the pilot pressure load change at a temperature of from 0° C. to 70° C. is 0.1 kgf, which is of greater advantage than that of the bearing made of SUJ alone (0.3 kgf). On the contrary, the bearing made of silicon nitride ceramics shows a pilot pressure load change of 1.2 kgf. Thus, when the initial pilot pressure is 0.8 kgf at 20° C., pilot pressure is eventually released completely at a temperature of 70° C.

Figure 6A:
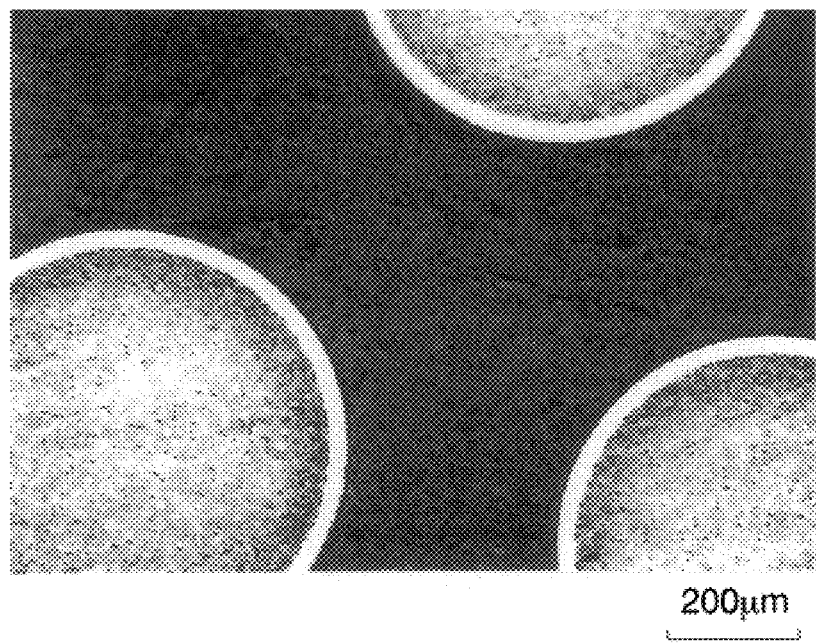
FIG. 6(a) is a sectional view illustrating the entire steel ball and FIG. 6(b) is a diagram illustrating in detail the surface layer of the steel ball.
Figure 6B:
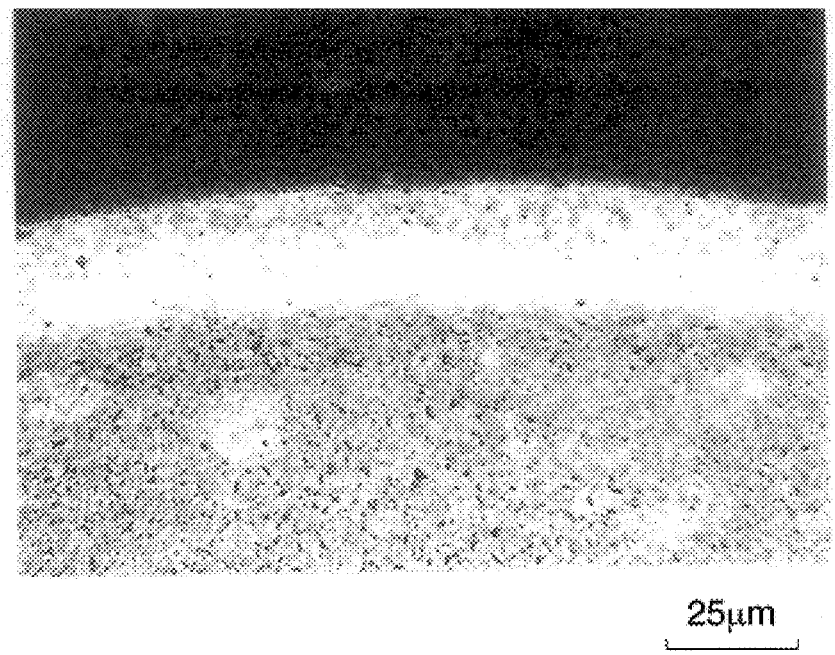
Figure 7A:
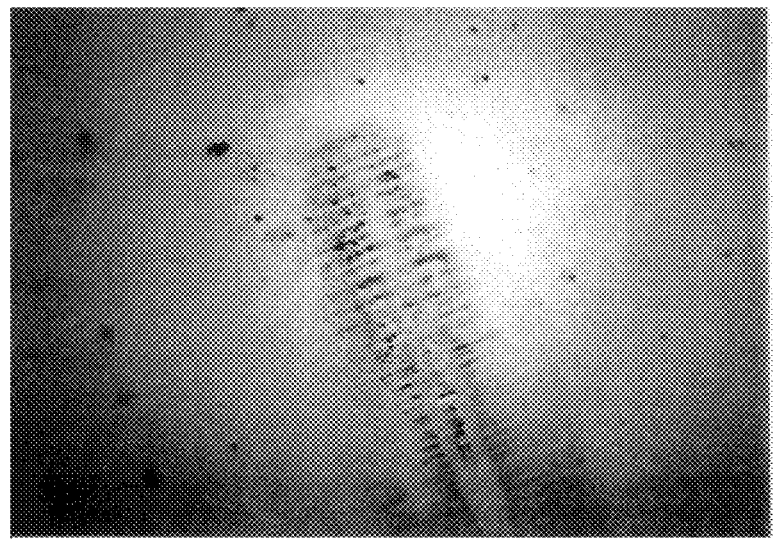
FIG. 7(a) is a diagram illustrating Comparative Example 4 and FIG. 7(b) is a diagram illustrating Example 3.
Figure 7B:
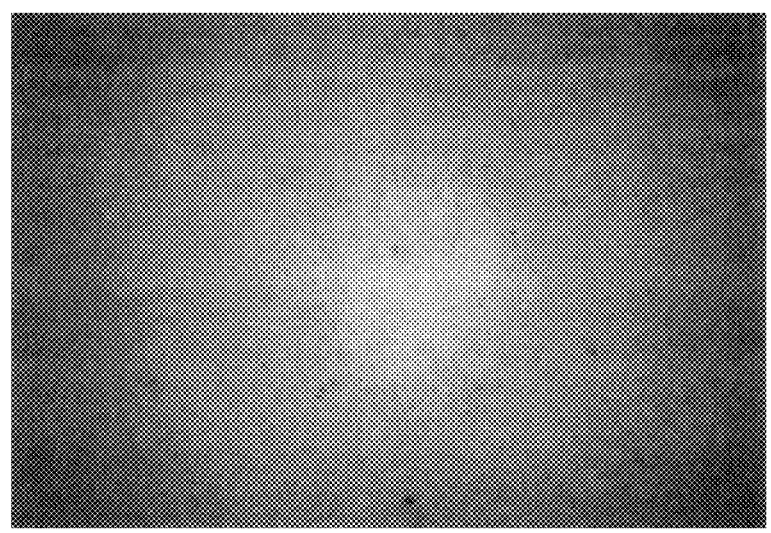

As mentioned above, the rolling bearings of the various examples provide remarkable improvement in durability or various properties, not to mention stillness, as ball bearing for data devices, particularly for HDD. FIG. 6 is a sectional view illustrating the rolling element of the foregoing examples. In the drawing, the white portion indicates a compound layer. As can be seen in FIG. 6, a dense nitride layer (compound layer) is formed very uniformly. FIG. 7 illustrates some of the results of observation (magnification: 360) of the surface of rolling elements of Comparative Example 4 (SUJ2 steel ball) and Example 3 after fretting test. SUJ2 steel ball of Comparative Example 4 shows remarkable damage due to fretting. On the contrary, Example 3 shows little damage. The mark of fretting damage has been, of course, made by the contact of the rolling element with the race. The width of the mark corresponds to the major diameter of the contact ellipsoid. The length of the mark corresponds to the travelling distance of the rolling element during rocking. The mark occurs at one position each on the inner race and the outer race, i.e., two positions in all.

Figure 8:
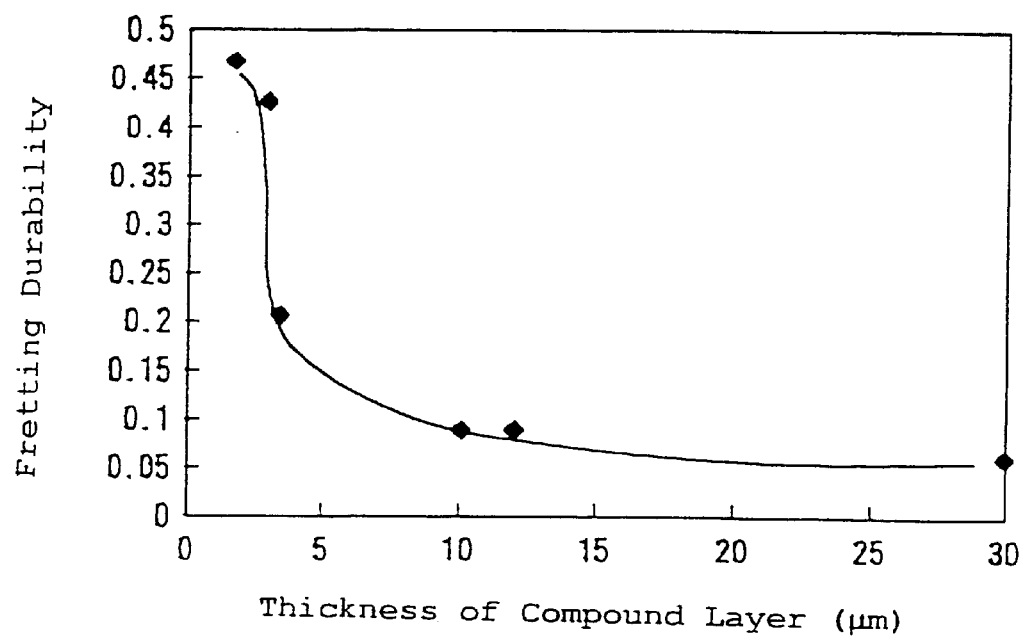
FIG. 8 is a diagram illustrating the relationship between the thickness of compound layer and the fretting durability.
Figure 9:
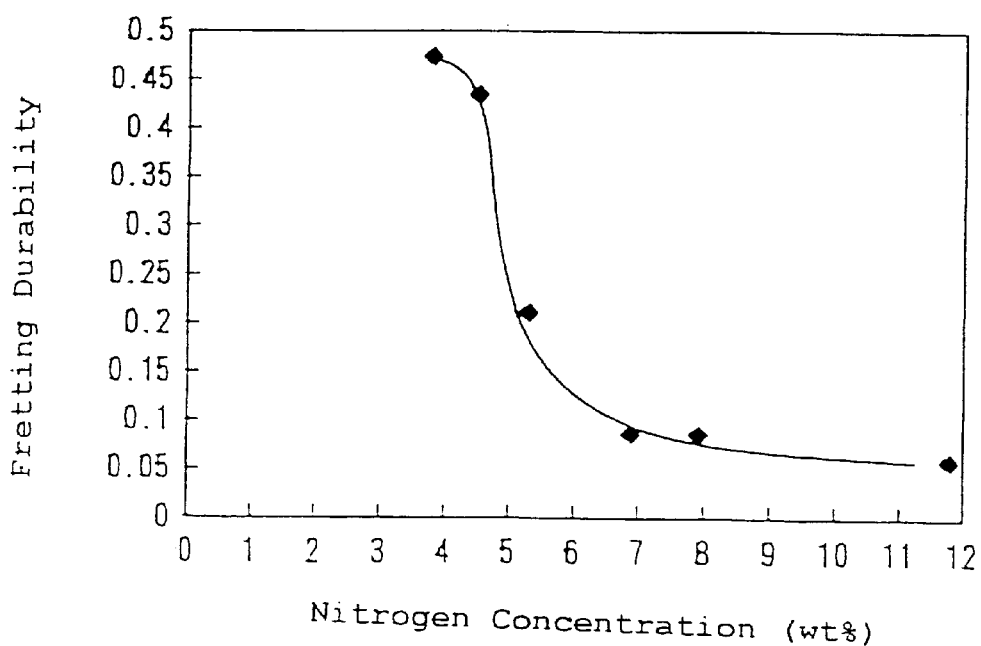
FIG. 9 is a diagram illustrating the relationship between the nitrogen concentration of the surface of the rolling element and the fretting durability of the rolling element.

FIG. 8 illustrates the results of evaluation of fretting durability of ball bearing 695 comprising rolling elements having different compound layer thicknesses produced by subjecting the material D set forth in Table 5 to nitriding and lapping in the same manner as in the foregoing examples. The results are shown in FIG. 8 as a relative value taking the fretting durability of ball bearing made of SUJ2 alone as 1 as in Table 7. As can be seen in FIG. 8, when the thickness of the compound layer falls below 3 μm, the rolling element shows a sudden drop of fretting durability. This is presumably because the compound layer has a composition gradient and the compound layer relatively close to the diffusion layer has (γ' phase having a low nitrogen concentration and) α-Fe as main phase as previously mentioned. FIG. 9 illustrates the relationship between the nitrogen concentration of the surface of the rolling element and the fretting durability. For the measurement of nitrogen concentration of the surface of the rolling element, EPMA was used. In some detail, the characteristic X-ray intensity of nitrogen was measured at an acceleration voltage of 10 kV. As can be seen in the results of FIG. 9, when the nitrogen concentration is 5% or more, i.e., nitrogen concentration corresponding to the calculated nitrogen concentration of γ' phase (5.9%) or higher, that is, when the compound layer intended for the invention is formed, the resulting effect is remarkable. Accordingly, the nitride layer formed on the surface of the rolling element preferably has a compound layer having a nitrogen concentration of 5% or more formed therein to a thickness of 3 μm or more. More preferably, the compound layer has a nitrogen concentration of 6% or more, even more preferably 7% or more, particularly 8% or more. From the standpoint of impact resistance, the thickness of the compound layer is preferably 2% or less of the diameter of the rolling element.

Further, since the hardness of the substrate supporting the compound of the surface layer is predetermined to HRC 57 or more, the resulting rolling bearing underwent no damage on the surface layer thereof and thus exhibited a good durability under extremely severer working conditions than actual working conditions. For example, when subjected to 1000 hour acoustic durability test at a pilot pressure of 6 kgf, which is five times that at the foregoing acoustic durability test, Comparative Example 4 (SUJ2 steel ball) showed a deterioration of acoustic properties which corresponds to three times or more the initial sound while Example 3 showed little deterioration of acoustic properties. Comparative Example 5 (silicon nitride ceramics ball) showed a deterioration of acoustic properties which corresponds to 1.8 times the initial sound. This is presumably partly attributed to the fact that ceramics has a relatively high longitudinal elastic modulus as compared with steel and thus is subject to higher face pressure under the same load.

Other embodiments of the rolling bearing according to the invention will be described hereinafter. All the bearings of the examples of the present embodiment and the comparative examples were evaluated for stillness and various durabilities in the form of ball bearing 695 (JIS Designation No.) As the rolling elements to be incorporated in these bearings there were all used those which had been lapped to a grade of 3 or more.

The rolling element of the invention or thus recommended was produced in the following manner. As the material of the rolling element there was used a martensite stainless steel having a carbon content of 0.45%, a Cr content of 13% and a nitrogen content of 0.15%. A wire rod having a diameter φ of 1.5 mm made of this steel was subjected to header working and flashing to produce a raw ball which was then subjected to hardening, sub-zero treatment and tempering.

Figure 10:
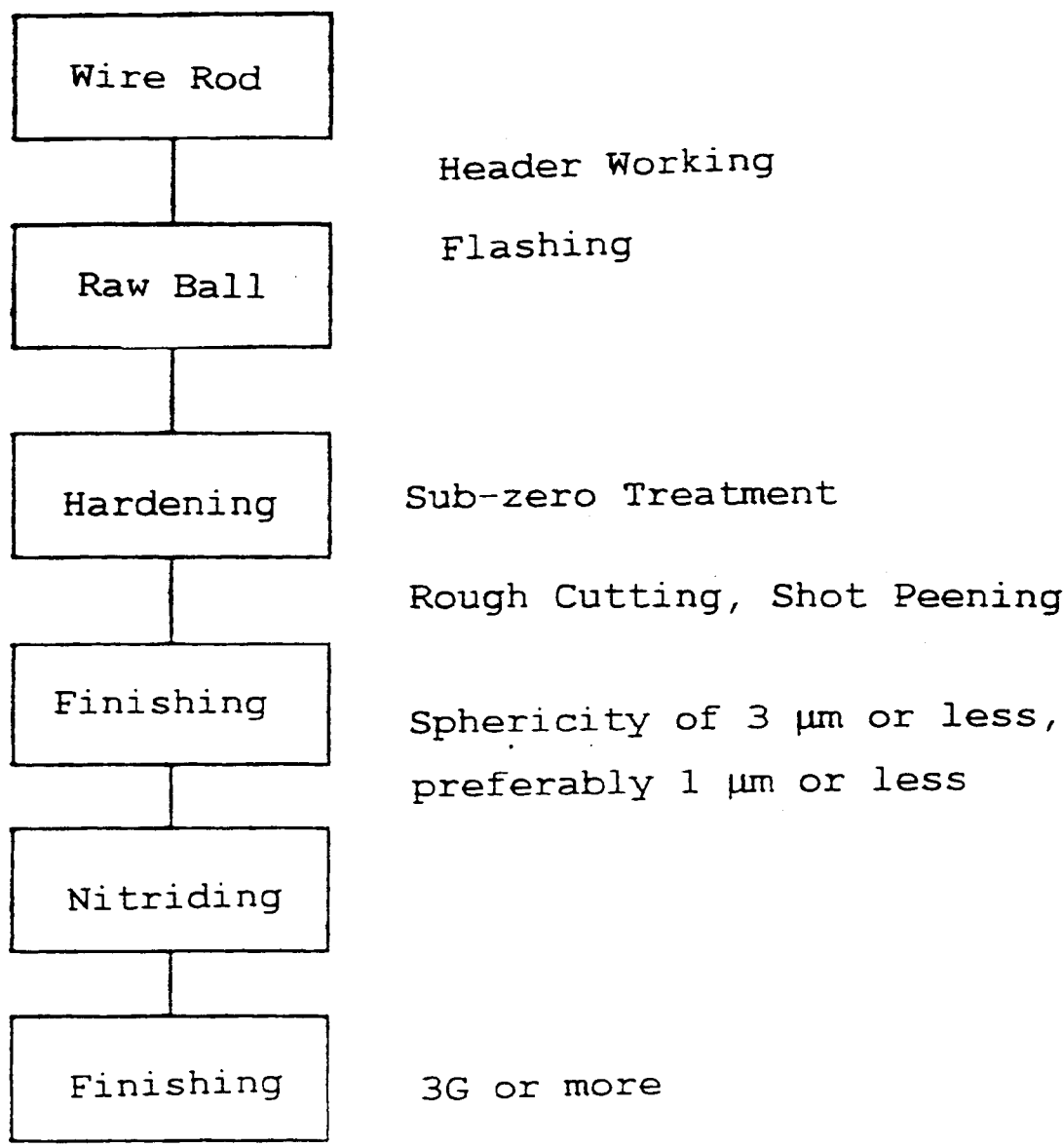
FIG. 10 is a schematic diagram illustrating another embodiment of the steel ball used in the example of the invention.

Thereafter, the raw ball thus treated was subjected to rough cutting, ball peening, finishing to a sphericity of 1.0 μm or less, nitriding and finishing (lapping). Referring to nitriding, Nv nitriding process (trade name or nitriding process of Daido Hoxan Inc.) was effected at a temperature of from 410° C. to 440° C. for 24 hours. FIG. 10 illustrates the outline of the process for the production of the rolling element of the present embodiment (example).

The quality of the rolling element is as follows. The diameter Da of the rolling element is 2 mmϕ.

Surface hardness: Hv 1,200 to 1,400 (measured by a vickers hardness meter under a load of 100 g)

Core hardness: HRC 58–62 (Vickers hardness measured under a load of 100 g was reduced to Rockwell hardness)

Thickness of nitride layer: 60 μm to 80 μm (about 3 to 4% Da, measured by observation of surface etched with a marble reagent)

Surface nitrogen concentration: 5.8 wt-% (measured at an acceleration voltage of 15 kV by EPMA)

Figure 11:
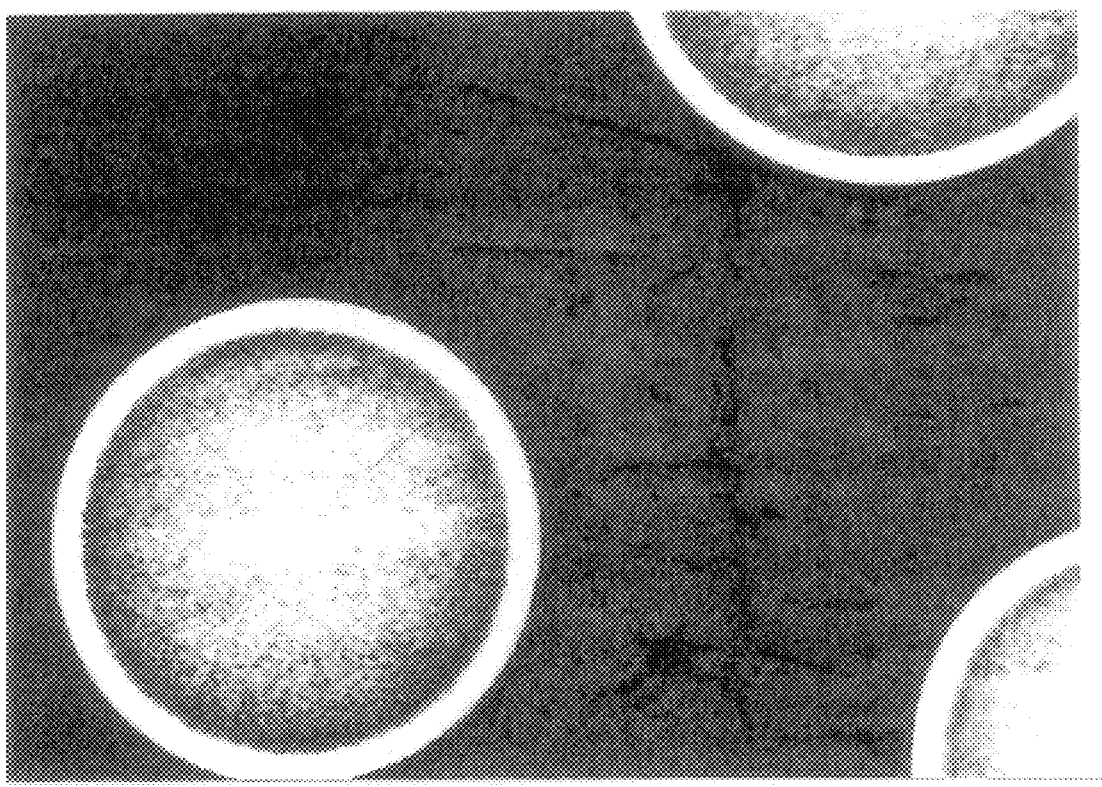
FIG. 11 is a sectional view illustrating a further embodiment of the steel ball used in the example of the invention.

Besides these properties, the rolling element exhibited a sphericity of 0.5 μm or less and a ball waviness of 40 npc in M.B (number of peaks per periphery: 5 to 30) and 83 npc or less in H.B (number of peaks per periphery: 30 to 160), which is comparable to that of SUJ2 ball and $Si_3N_4$ ball. FIG. 11 illustrates the section of the rolling element. It can be seen in FIG. 11 that a dense nitride layer is formed on the rolling element very uniformly.

In order to produce the races, SUJ2 was subjected to various heat treatments as shown in Table 8. Table 8 shows the heat treatment quality and the results of evaluation with the kind of the rolling elements (X in the table indicates the rolling element produced by the foregoing process). The content of retained austenite was measured by X-ray diffractometry. For the measurement of nitrogen concentration at 2% Da depth, the section nitrogen concentration distribution was measured by EPMA. For the measurement of hardness, Vickers hardness was measured under a load of 100 g. The measurements were reduced to Rockwell C hardness. As the cage there was used a plastic cage. As the bearing lubricant there was used an internal rust preventive oil or mineral oil-based grease.

TABLE 8

| Example/ Comparative Example | No. | Rolling element | Hardening | Heat treatment Sub-zero treatment | Tempering (° C.) | Surface hardness ($H_RC$) | Retained austenite γR (%) | 2% Da depth N % | Fretting durability | Acoustic durability | Impact resistance |
|---|---|---|---|---|---|---|---|---|---|---|---|
| Example | I-1 | X | Carbo-nitriding hardening | Done | 260–280 | 62.0 | 0 | 0.12 | 0.17 | 0.14 | 1.22 |
| | I-2 | X | Carbo-nitriding hardening | Done | 260–280 | 62.3 | 0 | 0.21 | 0.15 | 0.13 | 1.28 |
| | I-3 | X | Carbo-nitriding hardening | Done | 260–280 | 62.5 | 0 | 0.34 | 0.12 | 0.11 | 1.36 |
| | I-4 | X | Carbo-nitriding hardening | Done | 260–280 | 63.1 | 0 | 0.46 | 0.10 | 0.11 | 1.39 |
| | I-5 | X | Carbo-nitriding hardening | None | 260–280 | 60.3 | 0 | 0.12 | 0.19 | 0.18 | 1.09 |
| | I-6 | X | Carbo-nitriding hardening | None | 260–280 | 60.6 | 0 | 0.21 | 0.18 | 0.17 | 1.16 |
| | I-7 | X | Carbo-nitriding hardening | None | 260–280 | 61.2 | 0 | 0.34 | 0.17 | 0.15 | 1.19 |
| | I-8 | X | Carbo-nitriding hardening | None | 260–280 | 61.6 | 0.8 | 0.46 | 0.16 | 0.14 | 1.23 |
| Comparative Example | J-1 | X | Through hardening | Done | 220–240 | 59.5 | 0 | — | 0.26 | 0.21 | 1.00 |
| | J-2 | X | Through hardening | None | 220–240 | 56.2 | 0.7 | — | 0.34 | 0.31 | 0.95 |
| | J-3 | X | Through hardening | Done | 160–180 | 63.2 | 5.6 | — | 0.22 | 0.32 | 0.95 |
| | J-4 | X | Through hardening | None | 160–180 | 62.0 | S.9 | — | 0.29 | 0.49 | 0.55 |
| | J-5 | X | Carbo-nitriding hardening | Done | 160–180 | 64.3 | 7.1 | 0.34 | 0.12 | 0.38 | 1.00 |
| | J-6 | X | Carbo-nitriding hardening | None | 160–180 | 62.2 | 22.7 | 0.34 | 0.32 | 0.72 | 0.81 |
| | J-7 | X | Carbo-nitriding hardening | Done | 260–280 | 61.1 | 0 | 0.06 | 0.26 | 0.19 | 1.03 |
| | J-8 | X | Carbo-nitriding hardening | None | 260–280 | 59.6 | 0 | 0.06 | 0.35 | 0.31 | 0.96 |

TABLE 8-continued

| Example/Comparative Example | No. | Rolling element | Heat treatment | | | Surface hardness ($H_RC$) | Retained austenite $\gamma R$ (%) | 2% Da depth N % | Fretting durability | Acoustic durability | Impact resistance |
| --- | --- | --- | --- | --- | --- | --- | --- | --- | --- | --- | --- |
| | | | Hardening | Sub-zero treatment | Tempering (° C.) | | | | | | |
| | J-9 | X | Carbo-nitriding hardening | None | 340–360 | 60.3 | 0 | 0.34 | 0.25 | 0.27 | 1.01 |
| | J-10 | SUJ2 | Through hardening | Done | 220–240 | 59.5 | 0 | — | 1.00 | 1.00 | 1.00 |
| | J-11 | SUJ2 | Carbo-nitriding hardening | Done | 260–280 | 62.5 | 0 | 0.34 | 0.96 | 0.95 | 1.35 |
| | J-12 | $Si_3N_4$ | Through hardening | Done | 220–240 | 59.5 | 0 | — | 0.24 | 0.19 | 0.80 |

The bearings were each evaluated for acoustic durability, fretting durability, impact resistance, etc. Firstly, the axial vibration acceleration (G value) developed when the ball bearings were each operated at a pilot pressure of 1.2 kgf and a rotary speed of 1,800 rpm was measured to evaluate the initial sound. Thereafter, the bearings were subjected to evaluation of various properties. For the evaluation of acoustic durability, the bearings were each operated at a pilot pressure of 1.2 kgf, a rotary speed of 7,200 rpm and a temperature of 70° C. for 1,000 hours. Thereafter, the axial vibration acceleration (G value) was again measured. The deterioration of acoustic properties from the initial value was then determined. The value thus determined is set forth as a relative value taking that of Comparative Example J-10, which is made of SUJ2 alone, as 1. Thus, the smaller the figure in the table is, the better is the acoustic durability. For the evaluation of fretting durability, rocking test was effected under the following conditions. The deterioration of acoustic properties from the initial value was then determined. The value thus determined is set forth as a relative value taking that of Comparative Example J-10, which is made of SUJ2 alone, as 1. Accordingly, similarly to the results of evaluation of acoustic durability, the smaller the figure in the table is, the better is the fretting durability.

Evaluation of Fretting Durability

Pilot pressure: 1.2 kgf

Rocking conditions: 2°, 27 Hz

Repetition of rocking: 300,000 times

For the evaluation of impact resistance, the ball bearing was subject to a pure axial load of 1.2 kgf, 5 kgf, and 5 kgf plus 0.5 kgf, 1.0 kgf, 1.5 kgf, so forth. The pure axial load at which the axial vibration acceleration (G value) is 10 mG higher than that measured before test is defined as impact resistance load. The value thus determined was then evaluated in terms of the ratio to the contact face pressure of Comparative Example J-10, which is made of SUJ2 alone (elastic modulus was calculated using 208000 MPa of SUJ2). Accordingly, the large the figure in the table is, the better is the impact resistance.

As can be seen in Table 8, Examples I-1 to I-8 according to the present embodiment are superior to Comparative Examples J-1 to J-12 in all of acoustic durability, fretting durability and impact resistance. On the contrary, Comparative Examples J-1 to J-4 are about the combination of rolling elements produced according to the foregoing process and races obtained by subjecting ordinary SUJ2 to through hardening. These comparative examples are inferior to the various examples in not only impact resistance but also acoustic durability and fretting durability. Comparative Examples J-5 and J-6 are about the combination of rolling elements produced according to the foregoing process and races obtained by subjecting steel to carbonitriding and hardening. These comparative examples had a large content of retained austenite and thus were not observed to have improvement in impact resistance. Comparative Examples J-7 to J-9, too, are about the combination of rolling elements produced according to the foregoing process and races obtained by subjecting steel to carbonitriding and hardening. However, since the nitrogen concentration at 2% Da depth fell below 0.1% or the tempering temperature was higher than the foregoing recommended temperature, these comparative examples were not observed to have improvement in impact resistance. Comparative Examples J-10 and J-11 are about a conventional rolling bearing made of SUJ2 alone and the combination of rolling element made of SUJ2 and races obtained by subjecting steel to carbonitriding and hardening, respectively. These comparative examples cannot be prevented against damage on rolling element and are far inferior to the examples in fretting durability and acoustic durability. Comparative Example J-12 is about a conventional hybrid bearing comprising ceramics balls. The hybrid bearing of Comparative Example J-12 was thus found extremely poor in impact resistance. Comparative Example J-12 is also disadvantageous in that it is liable to dust noise or conveyance troubles at the production step, torque change or release of pilot pressure as in the case previously mentioned.

Examples I-1 to I-8 are about the essential use of steel. Accordingly, these examples exhibit a specific resistivity of $10^{-5}$ $\Omega$.cm or less, the order of which is almost the same as that of SUJ2. These examples also exhibit a slightly lower linear expansion coefficient than that of SUJ2 ($12.5 \times 10^{-6}$/° C.) (in the case of material, $10.8 \times 10^{-6}$/° C.). As the material of bearing there is often used ferrite stainless steel ($10.4 \times 10^{-6}$/° C.). In the case of this material, the pilot pressure load change at a temperature of from 0° C. to 70° C. is 0.1 kgf, which is of greater advantage than that of the bearing made of SUJ alone (0.3 kgf) On the contrary, the bearing made of silicon nitride ceramics shows a pilot pressure load change of 1.2 kgf. Thus, when the initial pilot pressure is about 0.8 kgf at 20° C., pilot pressure is eventually released completely at a temperature of 70° C.

Figure 12:
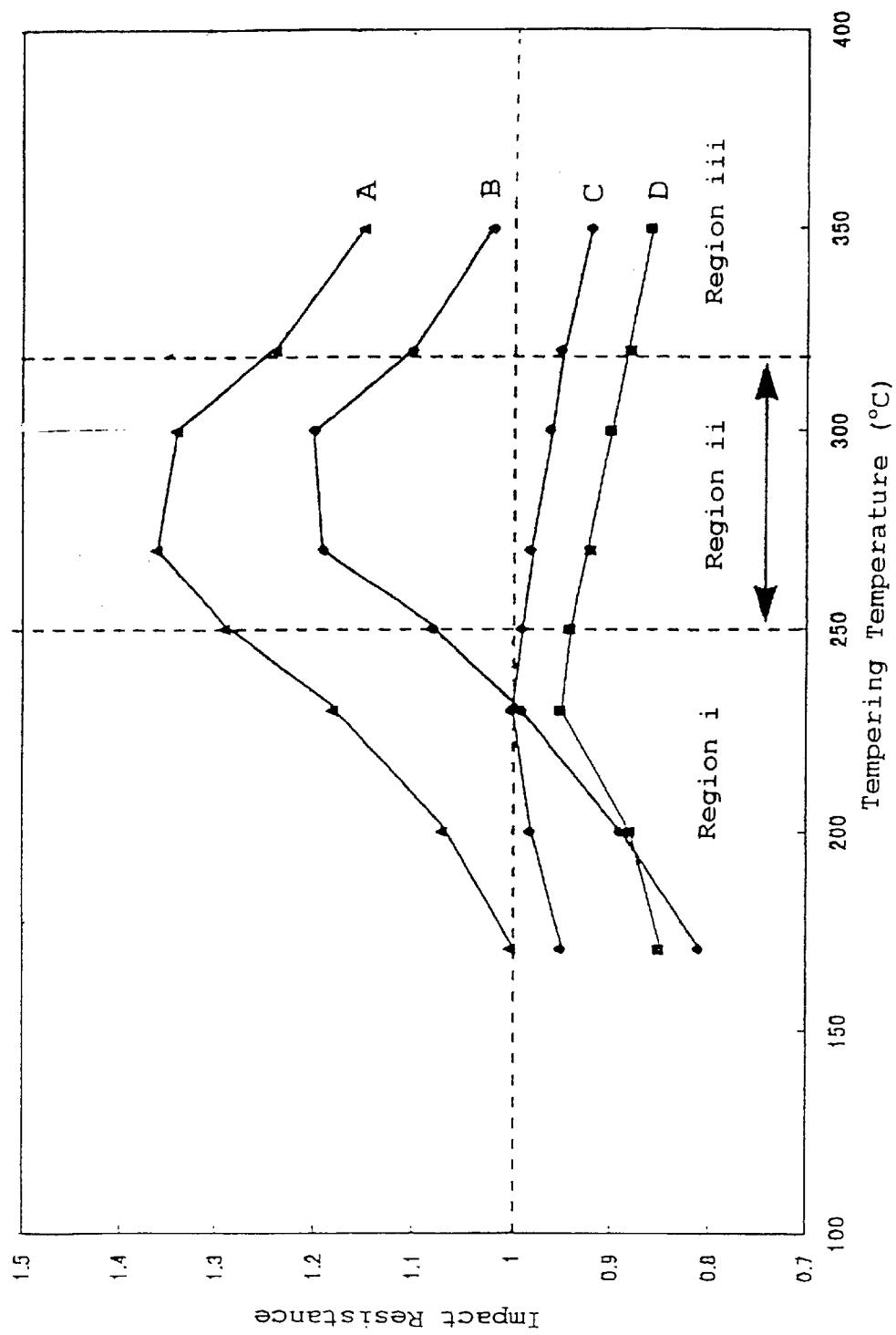
FIG. 12 is a diagram illustrating the relationship between the tempering temperature and the impact resistance.
Figure 13:
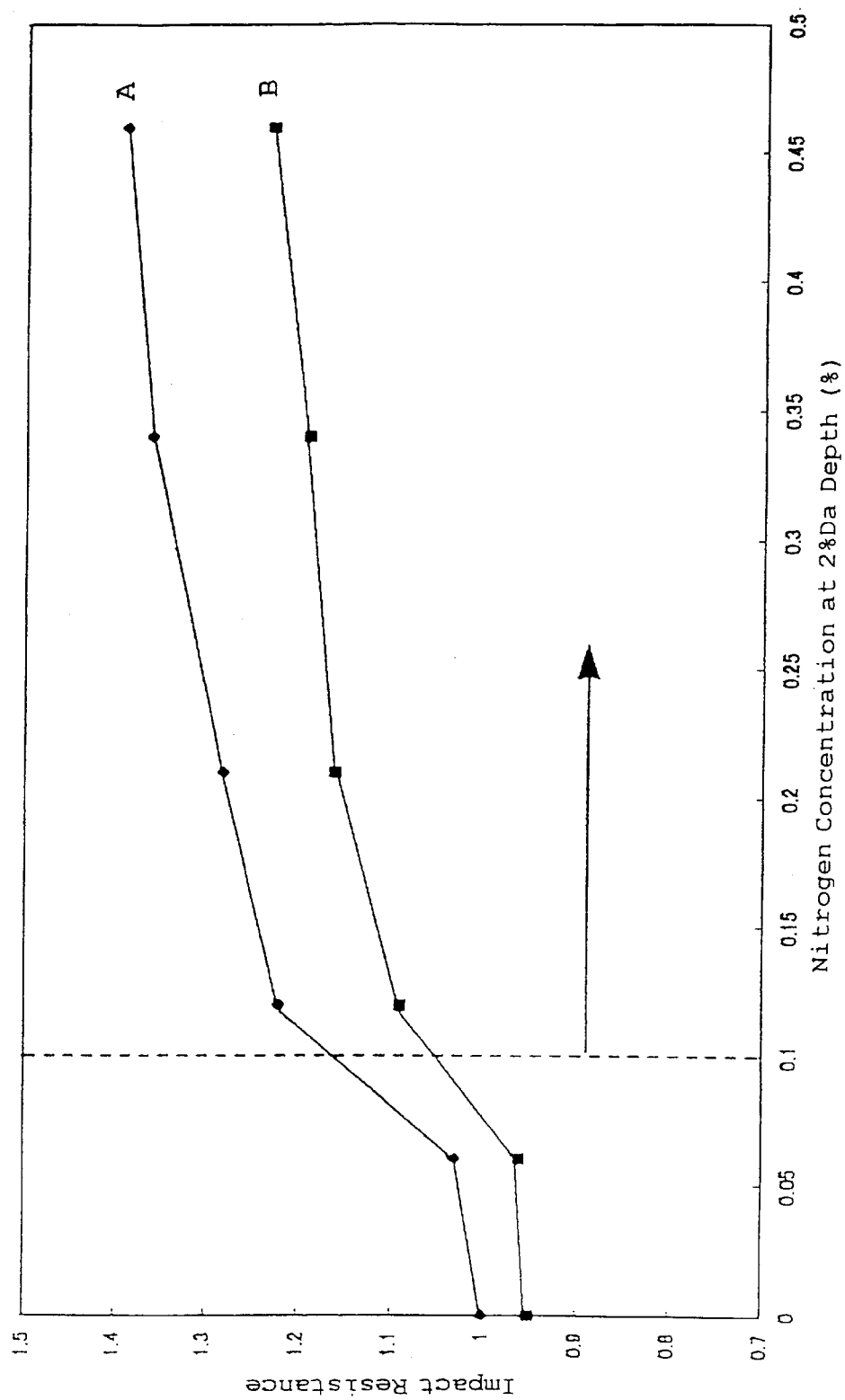
FIG. 13 is a diagram illustrating the relationship between the nitrogen concentration at 2% Da depth and the impact resistance.

FIG. 12 illustrates the results of further studies of the relationship between the tempering temperature and impact resistance of races. FIG. 13 collectively illustrates the relationship between the nitrogen concentration at 2% Da depth and the impact resistance (retained austenite $\gamma R \leq 1\%$, A: sub-zero treatment, B: without sub-zero treatment).

FIG. 12 gives the following conclusions. In other words, the first conclusion is that retained austenite is extremely harmful to impact resistance. The second conclusion is that even a steel material which has retained austenite almost completely decomposed has an optimum tempering temperature and is strongly affected by the tempering temperature. The third conclusion is that the steel material is preferably freed of retained austenite as much as possible prior to tempering. Finally, the fourth conclusion is that a steel material which has been carbonitrided provides particularly desirable results. These conclusions are presumably attributed to the following reasons.

It is thought that when austenite is retained in the raceway surface on the races (or the rolling surface of the rolling element), yield stress in minute region is reduced, causing slight permanent deformation and hence deteriorating the impact resistance, as previously interpreted. In addition to this case, even a steel material which has retained austenite almost completely decomposed undergoes a great change in its characteristics depending on the inner structure of the steel. FIG. 14 gives a simplified illustration of structural change due to hardening and tempering. In general, when a bearing steel is hardened, Mf point (temperature at which martensite transformation is terminated) is far lower than Ms point (temperature at which martensite transformation is initiated). Thus, it is impossible to transform austenite to martensite completely by hardening. When SUJ2 for example is hardened, austenite is retained in an amount of from 8 to 12%. When decomposed directly by tempering, the austenite is transformed to bainite (ferrite+cementite). However, when the steel material which has been hardened is subjected to induction transformation by sub-zero treatment, shot peening or ball peening, the produced amount of bainite is lowered, giving a tempered martensite having a higher uniformity. Accordingly, FIG. 12 shows that the steel material (A) which has been subjected to carbonitriding and hardening and then to sub-zero treatment gives better results than that (B) which has been subjected to carbonitriding and hardening and has not been subjected to the sub-zero treatment and the steel material (C) which has been subjected to through hardening and then to sub-zero treatment gives better results than that (D) which has been subjected to through hardening and has not been subjected to the sub-zero treatment, demonstrating that the content of bainite is preferably minimized to have a desirable effect on impact resistance.

When retained austenite is decomposed by tempering, the impact resistance is enhanced (region i) but gradually deteriorated (region iii) after complete decomposition of retained austenite (region ii; $\gamma_R \leq 1\%$). This is presumably because when acted upon by tempering, penetrating elements such as carbon and nitrogen solid-dissolved in martensite are precipitated in the form of carbide or carbonitride that then gradually condenses. In other words, the penetrating elements such as carbon and nitrogen solid-dissolved in martensite cause the effect of fixing dislocation to be lowered, and the carbide or carbonitride precipitated at the tempering step condense with each other, lessening the effect of pinning dislocation. In short, the mechanism of intensifying dislocation is relaxed. The reason why carbonitriding can provide desirable results is presumably that solid-dissolved nitrogen causes dislocation to be fixed more firmly and the carbonitride acts more effectively to stop dislocation. However, as can be seen in FIG. 13, the effect of nitrogen is very small in the case of rolling bearing unless the nitrogen concentration at a depth of 2% of the diameter Da of the rolling element is 0.1 wt-% or more (slightly greater on the outermost layer) because the rolling bearing is subject to vertical shearing force at the surface thereof.

The foregoing various embodiments have been described in detail with reference to the case where the rolling element is a ball. However, the rolling bearing of the invention can be applied to cylindrical and tapered rolling elements.

As mentioned above, the rolling bearing according to the invention comprises a dense nitride layer formed on the surface layer of the rolling elements and optionally an optimum carbonitride layer formed on the racess. In this arrangement, the deterioration of durability due to vibration or impact load during transportation can be prevented, not to mention improvement of stillness. Further, the deterioration of impact resistance required for hybrid bearing can be prevented. The release of pilot pressure and defective of acoustic properties due to electrostatic attraction of dust can be prevented. At the same time, the rolling element of the invention comprises a compound layer having an extremely high hardness formed uniformly, making it possible to finish to a high precision. Moreover, a great effect can be exerted of preventing the change of properties with time at high temperature or the deterioration of acoustic properties under other severe working conditions.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising an outer race, an inner race and a plurality of rolling elements or comprising an outer race, a shaft with raceway and a plurality of rolling elements, wherein said rolling elements have a dense nitride layer on the finished surface thereof and said nitride layer comprises a compound layer having a surface hardness Hv of 900 or more and a diffusion-hardened layer.

2. The rolling bearing according to claim 1, wherein the compound layer satisfies at least one of the condition that the thickness of the compound layer is 3 µm or more and the average thickness of the compound layer is not more than 2% Da, and the condition that the thickness of the compound layer is (0.075 to 1)*2% Da.

3. The rolling bearing according to claim 1 or 2, wherein said rolling element is produced by a bearing steel comprising Cr in an amount of 3% or more, satisfying the relationship C % $\leq$ –0.05Cr % +1.41%, with the proviso that the sum of the content of carbon and nitrogen is 0.45% or more, and comprising eutectic carbides having a major diameter of 5 µm or less.

4. The rolling bearing according to claim 1 or 2, wherein the core of the rolling element has a hardness HRC of 57 or more.

5. The rolling bearing according to claim 1 or 2, wherein the sphericity and mutual diameter difference of said rolling elements are each 0.05 µm or less and the surface roughness (Ra) of said rolling elements is 0.003 µm or less.

6. The rolling bearing according to claim 1 or 2, wherein the difference between the maximum thickness and the minimum thickness of the compound layer is 5 µm or less.

7. The rolling bearing according to claim 1 or 2, wherein the content of a retained austenite on at least one of the raceway surface of the inner race, the raceway surface of the outer race and the raceway surface of the shaft is 6 vol % or less.

8. The rolling bearing according to claim 1 or 2, wherein a carbonitrided layer having a nitrogen concentration of 0.1% by weight or more at the depth of 2% of the diameter Da of the rolling element is present on at least one of the raceway surface of the inner race, the raceway surface of the outer race and the raceway surface of the shaft.

9. The rolling bearing according to claim 1 or 2, which is to be used for a hard disk drive.

10. The rolling bearing according to claim 1 or 2, wherein said rolling elements are produced by a method which comprises: working a bearing steel comprising Cr in an amount of 3% or more, satisfying the relationship C %≦−0.05Cr %+1.41%, with the proviso that the sum of the content of carbon and nitrogen is 0.45% or more, and comprising carbides having a size of 5 $\mu$m or less to obtain a raw ball, hardening the raw ball, tempering, finishing to a semi-finished ball having a sphericity of 3 $\mu$m or less, nitriding, and lapping.

11. The rolling bearing according to claim 1 or 2, wherein the at least one of the inner race, the outer race and the shaft with raceway is produced by carbonitriding from a bearing steel, hardening, effecting induced transformation to martensite, and tempering.

* * * * *